United States Patent
Wan et al.

(10) Patent No.: US 12,026,920 B2
(45) Date of Patent: Jul. 2, 2024

(54) POINT CLOUD ENCODING AND DECODING METHOD, ENCODER AND DECODER

(71) Applicant: GUANGDONG OPPO MOBILE TELECOMMUNICATIONS CORP., LTD., Guangdong (CN)

(72) Inventors: Shuai Wan, Guangdong (CN); Lei Wei, Guangdong (CN); Fuzheng Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/343,651

(22) Filed: Jun. 28, 2023

(65) Prior Publication Data
US 2023/0351639 A1 Nov. 2, 2023

Related U.S. Application Data

(63) Continuation of application No. PCT/CN2020/142301, filed on Dec. 31, 2020.

(51) Int. Cl.
*G06T 9/00* (2006.01)
(52) U.S. Cl.
CPC ............ *G06T 9/00* (2013.01); *G06T 2210/36* (2013.01); *G06T 2210/56* (2013.01)
(58) Field of Classification Search
CPC ......................... G06T 2210/36; G06T 2210/56
See application file for complete search history.

(56) References Cited

U.S. PATENT DOCUMENTS

| 10,853,973 B2 | 12/2020 | Tourapis |
| 2019/0081638 A1 | 3/2019 | Mammou |

(Continued)

FOREIGN PATENT DOCUMENTS

| CN | 105701861 A | 6/2016 |
| CN | 111340899 A | 6/2020 |

(Continued)

OTHER PUBLICATIONS

JISC Information technology—MPEG-I (Coded Representation of Immersive Media)—Part 9: Geometry-based Point Cloud Compression ISO/IEC JTC 1/SC 29/WG 11, N19088, Apr. 15, 2020. 14 pages.

(Continued)

*Primary Examiner* — Jerry T Jean Baptiste
(74) *Attorney, Agent, or Firm* — PERKINS COIE LLP

(57) ABSTRACT

Disclosed are a point cloud encoding and decoding method, an encoder and a decoder. The method comprises: acquiring geometric information and attribute information of an input point cloud; determining a maximum allowable value of a sampling period when the input point cloud is subjected to level-of-detail (LOD) division; determining a preset value of the sampling period on the basis of the maximum allowable value of the sampling period; processing the input point cloud according to the preset value of the sampling period and the geometric information, so as to obtain at least one refinement layer and at least one detail layer; and encoding the attribute information by using the at least one refinement layer and the at least one detail layer, so as to generate a code stream, and writing the preset value of the sampling period into the code stream.

26 Claims, 5 Drawing Sheets

(56) References Cited

U.S. PATENT DOCUMENTS

| | | | |
|---|---|---|---|
| 2020/0111236 A1 | 4/2020 | Tourapis | |
| 2020/0153885 A1 | 5/2020 | Lee | |
| 2021/0082152 A1 | 3/2021 | Tourapis | |
| 2023/0316584 A1* | 10/2023 | Oh | ................... G06T 15/08 382/243 |

FOREIGN PATENT DOCUMENTS

| | | |
|---|---|---|
| EP | 3745354 A1 | 12/2020 |
| RU | 2018115810 A | 10/2019 |
| WO | 2020123469 A1 | 6/2020 |
| WO | 2020162495 A1 | 8/2020 |
| WO | 2020189876 A1 | 9/2020 |

OTHER PUBLICATIONS

Khaled Mammou et al., G-PCC codec description v2 ISO/IEC JTC 1/SC 29/WG 11, N18189, Jan. 31, 2019, Marrakech, MA, 3DG, Output Document. 7 pages.

International Search Report in the international application No. PCT/CN2020/142301, dated Sep. 27, 2021. 5 pages with English translation.

Written Opinion of the International Search Authority in the international application No. PCT/CN2020/142301, dated Sep. 27, 2021. 7 pages with English translation.

First Office Action of the Russian application No. 2023119870, issued on Feb. 15, 2024. 11 pages with English translation.

\* cited by examiner

POINT CLOUD ENCODING AND DECODING METHOD, ENCODER AND DECODER

CROSS-REFERENCE TO RELATED APPLICATION

This application is a continuation application of International Patent Application No. PCT/CN2020/142301, filed on Dec. 31, 2020, the disclosure of which is hereby incorporated by reference in its entirety.

BACKGROUND

In a frame of Geometry-based Point Cloud Compression (G-PCC) encoder, geometric information and attribute information of a point cloud are encoded respectively. As to encoding of the attribute information part, color space conversion is performed first, and then points after voxelization of the point cloud are re-colored to give attribute information to the point cloud.

However, in a process of Level of Detail (LOD) division of attributes of a point cloud according to the current related art, LOD is generated by a method with a fixed sampling period. The method has relatively low complexity, and may capture distribution of initial points well. However, the method does not consider system consistency, so that encoding and decoding efficiencies are affected.

SUMMARY

Embodiments of the disclosure provide point cloud encoding and decoding methods, an encoder, and a decoder.

Technical solutions of the embodiments of the disclosure may be implemented as follows. According to a first aspect, an embodiment of the disclosure provides a point cloud encoding method, applied to an encoder. The method includes the following operations. Geometric information and attribute information of an input point cloud are acquired. A maximum allowable value of a sampling period when the input point cloud is subjected to LOD division, is determined. A preset value of the sampling period is determined based on the maximum allowable value of the sampling period. The input point cloud is processed according to the preset value of the sampling period and the geometric information, to obtain at least one refinement layer and at least one detail layer. The attribute information is encoded by using the at least one refinement layer and the at least one detail layer, to generate a bitstream, and the preset value of the sampling period is written into the bitstream.

According to a second aspect, an embodiment of the disclosure provides a point cloud decoding method, applied to a decoder. The method includes the following operations. A bitstream is parsed, and geometric information of a decoded point cloud and a parsed value of a sampling period when the decoded point cloud is subjected to LOD division, are determined. A maximum allowable value of the sampling period is determined. In response to the parsed value of the sampling period being less than or equal to the maximum allowable value of the sampling period, the decoded point cloud is processed according to the parsed value of the sampling period and the geometric information, to obtain at least one refinement layer and at least one detail layer. Attribute information of the decoded point cloud is decoded by using the at least one refinement layer and the at least one detail layer, and a reconstructed point cloud of the decoded point cloud is determined.

According to a third aspect, an embodiment of the disclosure provides an encoder, comprising a memory and a processor, wherein the memory is configured to store a computer program executable on the processor, the processor is configured to execute operations of: acquiring geometric information and attribute information of an input point cloud; determining a maximum allowable value of a sampling period when the input point cloud is subjected to Level of Detail (LOD) division; determining a preset value of the sampling period based on the maximum allowable value of the sampling period; processing the input point cloud according to the preset value of the sampling period and the geometric information, to obtain at least one refinement layer and at least one detail layer; and encoding the attribute information by using the at least one refinement layer and the at least one detail layer, to generate a bitstream, and writing the preset value of the sampling period into the bitstream.

According to a third aspect, an embodiment of the disclosure provides a decoder, comprising a memory and a processor, wherein the memory is configured to store a computer program executable on the processor, the processor is configured to execute operations of: parsing a bitstream, and determining geometric information of a decoded point cloud and a parsed value of a sampling period when the decoded point cloud is subjected to Level of Detail (LOD) division; determining a maximum allowable value of the sampling period; in response to the parsed value of the sampling period being less than or equal to the maximum allowable value of the sampling period, processing the decoded point cloud according to the parsed value of the sampling period and the geometric information, to obtain at least one refinement layer and at least one detail layer; and decoding attribute information of the decoded point cloud by using the at least one refinement layer and the at least one detail layer, and determining a reconstructed point cloud of the decoded point cloud.

DETAILED DESCRIPTION

Figure 1A:
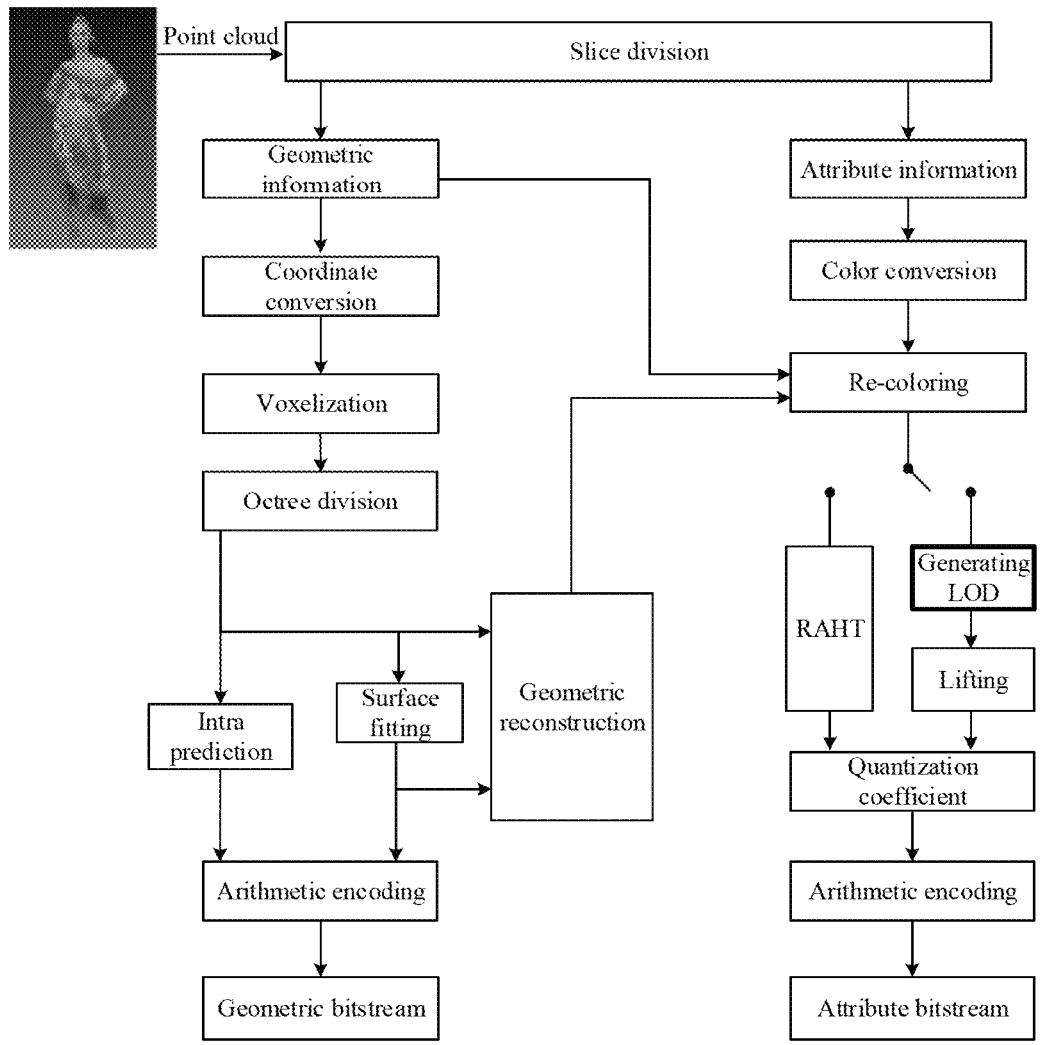
FIG. 1A is a schematic diagram of a frame composition of a G-PCC encoder provided by the related art.

In order to understand characteristics and technical contents of embodiments of the disclosure more thoroughly, implementations of the embodiments of the disclosure will be described in detail below with reference to the drawings, the drawings are provided for the purpose of reference and illustration only, and are not intended to limit the embodiments of the disclosure.

Unless otherwise defined, all technical and scientific terms used here have the same meaning as usually understood by those skilled in the art to which the disclosure belongs. The terms used here are only for the purpose of describing the embodiments of the disclosure, and are not intended to limit the disclosure.

In the following descriptions, reference to "some embodiments" describe a subset of all possible embodiments, however, it may be understood that "some embodiments" may be the same or different subsets of all possible embodiments, and may be combined with each other without conflict.

It should be noted that terms "first\second\third" involved in the embodiments of the disclosure are only intended to distinguish different objects and do not represent specific sorting of the objects, and it may be understood that "first \ second \ third" may exchange their specific orders or sequences in an allowable situation, so that the embodiments of the disclosure described here may be implemented in an order other than those illustrated or described here.

Before the embodiments of the disclosure are further described in detail, nouns and terms involved in the embodiments of the disclosure are explained, and the nouns and terms involved in the embodiments of the disclosure are applicable to the following explanations: Point Cloud Compression (PCC), Geometry-based Point Cloud Compression (G-PCC), Video Point Cloud Compression (V-PCC), Level of Detail (LOD), Region Adaptive Hierarchal Transform (RAHT), slice, bounding box, octree, triangle soup (trisoup), block, vertex, RootNode, Moving Picture Experts Group (MPEG), International Standardization Organization (ISO), International Electrotechnical Commission (IEC), Audio Video Standard (AVS).

Here, a point cloud is a three-dimensional (3D) representation form of a surface of an object, and the point cloud (data) on the surface of the object may be acquired by acquisition devices such as a photoelectric radar, a laser radar, a laser scanner, a multi-view camera, or the like.

A point cloud refers to a set of massive 3D points, and a point in the point cloud may include position information and attribute information of the point. For example, the position information of the point may be 3D coordinate information of the point. The position information of the point may also be referred to as geometric information of the point. For example, the attribute information of the point may include color information and/or reflectivity, or the like. For example, the color information may be information in any color space. For example, the color information may be RGB information. Here, R represents Red (R), G represents Green (G), and B represents Blue (B). For another example, the color information may be luminance chroma (YcbCr, YUV) information. Here, Y represents luminance, Cb (U) represents a blue color difference, and Cr (V) represents a red color difference.

In a point cloud obtained according to a laser measurement principle, a point in the point cloud may include 3D coordinate information and laser reflectance of the point. For another example, in a point cloud obtained according to a photogrammetry principle, a point in the point cloud may include 3D coordinate information and color information of the point. For another example, in a point cloud obtained according to a combination of the laser measurement principle and the photogrammetry principle, a point in the point cloud may include 3D coordinate information, laser reflectance and color information of the point.

Based on manners of acquiring point clouds, the point clouds may be divided into:
 a first type of static point cloud: that is, an object is stationary, and a device for acquiring the point cloud is also stationary;
 a second type of dynamic point cloud: an object is movable, however, a device for acquiring the point cloud is stationary;
 a third type of dynamic acquisition point cloud: a device for acquiring the point cloud is movable.

For example, Based on usage of point clouds, the point clouds may be divided into two categories:
 Category 1: machine perception point cloud, which may be used in scenarios such as an autonomous navigation system, a real-time inspection system, a geographic information system, a visual sorting robot, an emergency rescue and disaster relief robot, or the like;
 Category 2: human eye perception point cloud, which may be used in point cloud application scenarios such as digital cultural heritage, free viewpoint broadcast, 3D immersion communication, 3D immersion interaction, or the like.

Since the point cloud is a set of massive points, storage of the point cloud not only consumes a large amount of memories, but also is not beneficial for transmission, and there is not such a large bandwidth to support direct transmission of the point cloud on a network layer without compression. Therefore, the point cloud needs to be compressed.

Until now, a point cloud encoding frame capable of compressing a point cloud may be a G-PCC encoding and decoding frame or a V-PCC encoding and decoding frame provided by MPEG, or may be an AVS-PCC encoding and decoding frame provided by AVS. The G-PCC encoding and decoding frame may be configured to compress the first type of static point cloud and the third type of dynamic acquisition point cloud, and the V-PCC encoding and decoding frame may be configured to compress the second type of dynamic point cloud. The G-PCC encoding and decoding frame is also referred to as a point cloud codec TMC13, and the V-PCC encoding and decoding frame is also referred to as a point cloud codec TMC2.

It may be understood that in a frame of a point cloud G-PCC encoder, slice division is performed on an input point cloud, and then the slice is encoded independently.

In a frame of G-PCC encoder shown in FIG. 1A, slice division is performed on an input point cloud, and then the slice is encoded independently. In the slice, geometric information and attribute information of the point cloud are encoded respectively. The G-PCC encoder encodes the geometric information first. The encoder performs coordinate conversion on the geometric information, so that all point clouds are included in a bounding box; and then the encoder performs quantization which mainly plays a role of zooming, and due to rounding-down by quantization, geometric information of a part of points are the same, whether repetitive points are removed or not is determined according to parameters, and the process of quantization and removing the repetitive points is also referred to as a voxelization process. Next, octree-based division is performed on the bounding box. According to different depths of octree division levels, encoding of the geometric information is divided into two frames, i.e., octree-based frame and trisoup-based frame respectively.

In the octree-based encoding frame of the geometric information, the bounding box is subjected to eight-equal division to obtain eight sub-cubes, and placeholder bits of the sub-cubes are recorded (here, 1 is non-empty, 0 is empty), non-empty sub-cubes continue to be subjected to eight-equal division, and division is stopped usually when leaf sub-nodes obtained through division are 1×1×1 unit cubes. In this process, intra prediction is performed on the placeholder bit by using spatial correlation between a node and surrounding nodes, and finally arithmetic encoding such as Context-based Adaptive Binary Arithmetic Coding (CABAC) is performed, to generate a binary geometric bitstream, i.e., a geometric bitstream.

In the trisoup-based encoding frame of the geometric information, octree division is also performed first, but its difference lies in octree-based encoding of the geometric information, the method does not need to divide the point cloud into unit cubes with a side length of 1×1×1 step-by-step, instead, it stops when the point cloud is divided so that a side length of a block is W, and based on a surface formed by distribution of point clouds in each block, at most twelve vertexes generated by twelve edges of the surface and the block are obtained. Finally, coordinates of vertexes of each block are encoded in sequence to generate a binary geometric bitstream, i.e., a geometric bitstream.

After completing encoding of the geometric information, the G-PCC encoder reconstructs the geometric information, and encodes the attribute information of the point cloud by using the reconstructed geometric information. At present, attribute encoding of the point cloud is mainly intended to encode color information of a point in the point cloud. First, the encoder may perform color conversion on the color information of the point, for example, when the color information of the point in the input point cloud is represented by using a RGB color space, the encoder may convert the color information from the RGB color space to a YUV color space. Then, the point cloud is re-colored by using the reconstructed geometric information, so that un-encoded attribute information corresponds to the reconstructed geometric information. There are mainly two transformation methods used in encoding of the color information, one method is distance-based lifting transformation dependent on LOD division, and the other method is to directly perform RAHT transformation, both of which may transform the color information from a spatial domain to a frequency domain to obtain a high-frequency coefficient and a low-frequency coefficient, and finally quantization and arithmetic encoding are performed on the coefficients to generate a binary attribute bitstream, i.e., an attribute bitstream.

Figure 1B:
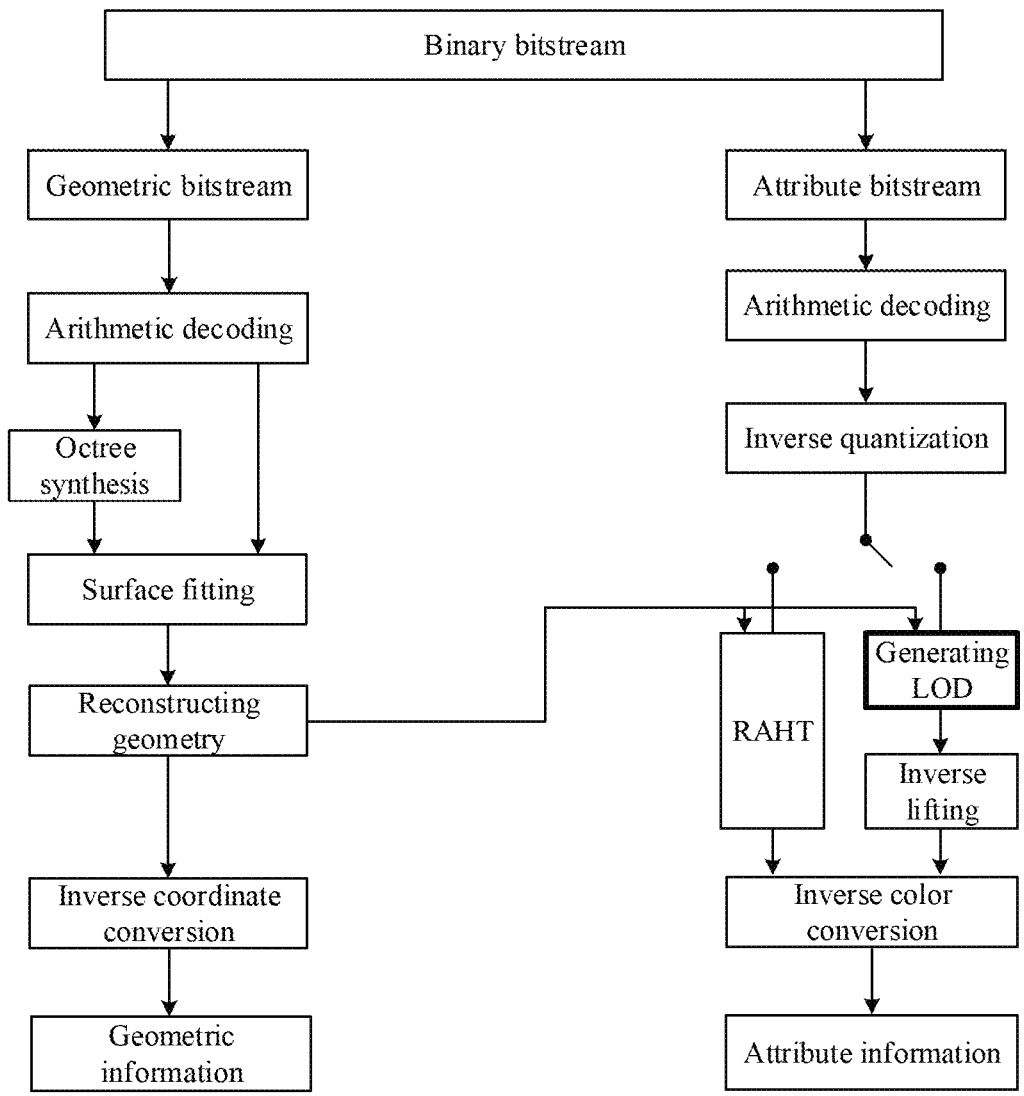
FIG. 1B is a schematic diagram of a frame composition of a G-PCC decoder provided by the related art.

In a frame of G-PCC decoder shown in FIG. 1B, after obtaining a binary bitstream, independent decoding is performed on geometric bitstream and attribute bitstream in the binary bitstream respectively. During decoding of the geometric bitstream, geometric information of the point cloud is obtained by arithmetic decoding—octree synthesis—surface fitting—reconstructing geometry—inverse coordinate transformation; and during decoding of the attribute bitstream, attribute information of the point cloud is obtained by arithmetic decoding—inverse quantization—LOD-based inverse lifting or RAHT-based inverse transformation—inverse color conversion, and a 3D image model of to-be-encoded point cloud data is restored based on the geometric information and the attribute information.

Figure 2:
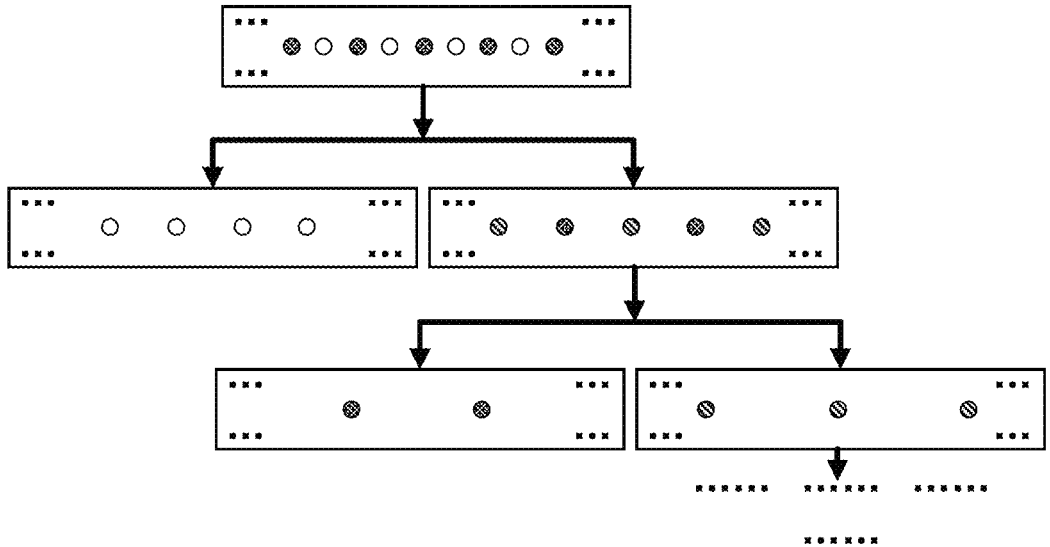
FIG. 2 is a schematic structural diagram of a sampling-based LOD division process provided by the related art.

It should be noted that there are three modes used in encoding of the attribute information: a prediction mode, a lifting mode, and a RAHT mode. As to the prediction mode and the lifting mode, LOD division needs to be performed on the point cloud. LOD means that the point cloud is divided into a series of refinement layers and detail layers according to a certain manner. As shown in FIG. 2, a schematic structural diagram of a sampling-based LOD division process provided by the related art is shown. In FIG. 2, LOD is generated by using a method with a fixed sampling period. The method with the fixed sampling period is used specifically as follows. Firstly, point clouds are sorted, and then sampling is performed according to a sampling period set by a user, to obtain refinement layers and detail layers. Next, the detail layers are sampled again to obtain new refinement layers and new detail layers; and as a candidate, the new detail layers are continuously sampled in sequence, until only one point is present in the detail layer or a LOD division number of layers set by the user is reached, to stop division. Specifically, following descriptions are made with reference to FIG. 2.

A point cloud data 201 ($LOD_1$) is sampled according to a sampling period of 2 to obtain an refinement layer 202 and a detail layer 203 (i.e., $LOD_2$); the detail layer 203 is continuously sampled according to the sampling period of 2 to obtain a new refinement layer 304 and a new detail layer 305 (i.e., $LOD_3$); and division is stopped subsequently until only one point is present in the detail layer or a LOD division number of layers set by the user is reached.

After LOD division is performed, prediction or lifting transformation is performed by using these detail layers. In a prediction encoding process, a current point is predicted by using points in the encoded detail layer and encoded points in a current refinement layer; and in a lifting transformation process, points in the refinement layer are predicted by using points in the detail layer, and then the points in the detail layer is updated by using prediction residuals.

However, in the method for generating LOD based on the fixed sampling period according to the current related art, the sampling period is configured to sample the point cloud to obtain detail layers, and remaining points are used as refinement layers. A series of refinement layers and final detail layers may be obtained by performing a series of sampling on the detail layers. The method has relatively low complexity, may capture distribution of initial points well, and may predict non-smooth attribute information on an irregular sampled point cloud more effectively. However, at present, a maximum value of the sampling period of LOD is not specified, that is, a value range of a syntax element sampling_period_minus2 is not explicitly specified, so that consistency check cannot be performed on the sampling period in the sampling-based LOD generation method set by the user in the encoder/decoder, therefore system consistency and encoding efficiency are affected to a certain extent, and encoding and decoding efficiencies are reduced due to uncertainty of the range of the syntax element.

An embodiment of the disclosure provides a point cloud encoding method, and a basic idea of the method at an encoder side is that geometric information and attribute information of an input point cloud are acquired; a maximum allowable value of a sampling period when the input point cloud is subjected to LOD division, is determined; a preset value of the sampling period is determined based on the maximum allowable value of the sampling period; the input point cloud is processed according to the preset value of the sampling period and the geometric information, to obtain at least one refinement layer and at least one detail layer; the attribute information is encoded by using the at least one refinement layer and the at least one detail layer, to generate a bitstream, and the preset value of the sampling period is written into the bitstream. In this way, since a maximum value of the sampling period is specified in both the encoder and the decoder, it may ensure that the preset value of the sampling period does not exceed the maximum value of the sampling period, so that when a series of processing are performed on the point cloud by using the preset value of the sampling period, system consistency may be enhanced, and encoding and decoding efficiencies may also be improved.

Embodiments of the disclosure will be described in detail below with reference to the drawings.

In an embodiment of the disclosure, the point cloud encoding method provided in the embodiment of the disclosure is applied to a video encoding device, i.e., a G-PCC encoder which may be abbreviated as an encoder. Functions implemented by the method may be implemented by a first processor in the encoder calling a computer program, of course, the computer program may be stored in a first memory, and it may be seen that the encoder includes at least the first processor and the first memory.

Figure 3:
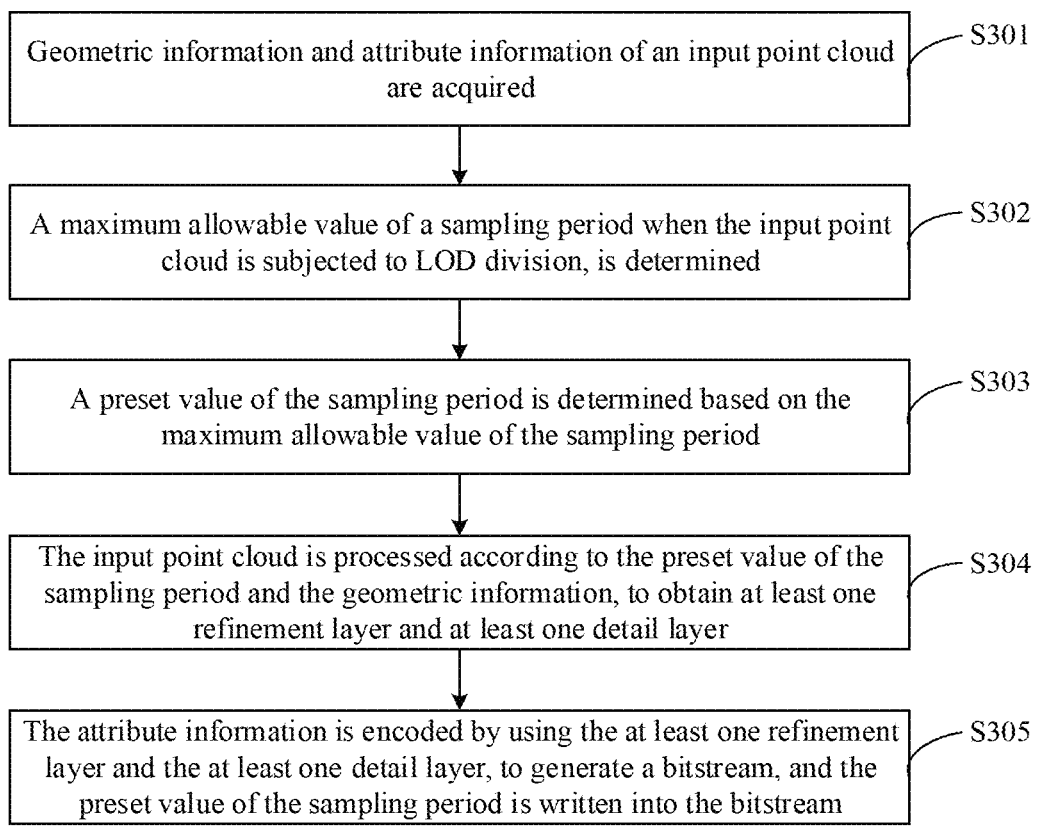
FIG. 3 is a schematic flowchart of a point cloud encoding method according to an embodiment of the disclosure.

With reference to FIG. 3, there is shown a schematic flowchart of a point cloud encoding method according to an embodiment of the disclosure. As shown in FIG. 3, the method may include the following operations S301 to S305.

In operation S301, geometric information and attribute information of an input point cloud are acquired.

It should be noted that points in the point cloud may be all points in the point cloud, or may be a part of the points in the point cloud, and these points are relatively centralized in space.

It should also be noted that based on the frame of G-PCC encoder shown in FIG. 1A, the method according to the embodiment of the disclosure is mainly applied to the "Generating LOD" part, and as to the problem of the sampling period of LOD in the current related art, a maximum value of the sampling period may be adaptively calculated according to contents of the point cloud, to ensure system consistency.

Here, the input point cloud may be understood as point cloud data which needs to be layered, such as point cloud data for forming a 3D video, or the like. The input point cloud may include the geometric information and the attribute information. When the point cloud is encoded, the geometric information and the attribute information of the point cloud are encoded separately. The geometric information includes a normal vector of the point cloud, a curvature, a density of the point cloud, a surface roughness of the point cloud, a center of gravity of the point cloud, a weight center of gravity of the point cloud, a covariance of the point cloud, a cross covariance of the point cloud, or the like. The attribute information includes: square of a division distance of the input point cloud, a total division number of layers, information of color space, spatial resolution, precision of point position, a surface normal vector, or the like. After encoding of the geometric information, encoding of the attribute information may involve LOD layering at this time, and the layering may be implemented according to Morton codes, or may be implemented according to the sampling period. In the embodiment of the disclosure, LOD layering is implemented by using the sampling period.

In operation S302, a maximum allowable value of a sampling period when the input point cloud is subjected to LOD division, is determined.

In operation S303, a preset value of the sampling period is determined based on the maximum allowable value of the sampling period.

It should be noted that in a process of implementing LOD layering by using the sampling period, not only the preset value of the sampling period needs to be determined, but also the maximum allowable value of the sampling period needs to be determined, to ensure that the preset value of the sampling period does not exceed the maximum allowable value of the sampling period, thereby enhancing system consistency.

It should also be noted that the maximum allowable value of the sampling period is mainly related to related contents of the input point cloud, such as a total number of points contained in the input point cloud, a number of points contained in a slice, a maximum allowable number of points contained in the slice, or the like.

In some embodiments, the operation of determining the maximum allowable value of the sampling period when the input point cloud is subjected to LOD division may include the following operations.

A total number of points contained in the input point cloud, is determined.

The maximum allowable value of the sampling period is determined according to the total number of points contained in the input point cloud.

In a specific embodiment, the operation of determining the maximum allowable value of the sampling period according to the total number of points contained in the input point cloud may include the following operations.

The maximum allowable value of the sampling period is set to be equal to the total number of points contained in the input point cloud.

That is, in a possible implementation, according to the embodiment of the disclosure, the total number of points contained in the input point cloud may be determined, and then the total number of points contained in the input point cloud is determined as the maximum allowable value of the sampling period. At this time, the preset value of the sampling period will be less than or equal to the total number of points contained in the input point cloud.

It should also be noted that a conformance parameter is configured to characterize its own attribute of the point cloud bitstream, and includes at least one of the following parameters: profile, tier or level, or may be configured to determine the maximum allowable value of the sampling period. Specifically, in some embodiments, the operation of determining the maximum allowable value of the sampling period when the input point cloud is subjected to LOD division may include the following operations.

A conformance parameter of the input point cloud is determined, here, the conformance parameter includes at least one of a profile parameter, a tier parameter, or a level parameter.

The maximum allowable value of the sampling period is determined according to the conformance parameter.

In a specific embodiment, the operation of determining the maximum allowable value of the sampling period according to the conformance parameter may include the following operations. The maximum allowable value of the sampling period is set to be equal to a preset value corresponding to the conformance parameter.

That is, in another possible implementation, according to the embodiment of the disclosure, the conformance parameter of the input point cloud may be determined, and then the maximum allowable value of the sampling period is determined according to the conformance parameter of the input point cloud. Here, in the embodiment of the disclosure, the maximum allowable value of the sampling period may be set to be equal to the preset value corresponding to the conformance parameter.

In some embodiments, the operation of determining the maximum allowable value of the sampling period when the input point cloud is subjected to LOD division may include the following operations.

The maximum allowable value of the sampling period is set as a preset constant value.

That is, in yet another possible implementation, according to the embodiment of the disclosure, the maximum allowable value of the sampling period may be set as the preset constant value. Here, the preset constant value is an integer value greater than zero.

In some embodiments, the operation of determining the maximum allowable value of the sampling period when the input point cloud is subjected to LOD division may include the following operations.

A total number of points contained in the input point cloud, is determined.

In response to the total number of points contained in the input point cloud being greater than a maximum allowable number of points contained in a slice, the input point cloud is divided to obtain at least one slice and determine a number of points contained in the at least one slice.

The maximum allowable value of the sampling period is determined according to the number of points contained in the at least one slice.

In a specific embodiment, the operation of determining the maximum allowable value of the sampling period according to the number of points contained in the at least one slice may include the following operations.

A maximum value is selected from the number of points, and the maximum value is determined as the maximum allowable value of the sampling period.

That is, in yet another possible implementation, after determining the total number of points contained in the input point cloud, according to the embodiment of the disclosure, the total number of points contained in the input point cloud may be further compared with the maximum allowable number of points contained in the slice. When the total number of points contained in the input point cloud is greater than the maximum allowable number of points contained in the slice, slice division needs to be performed on the input point cloud at this time, to obtain at least one slice; and then the number of points contained in the at least one slice (which may be represented by $N_i$) is determined; therefore, the maximum allowable value of the sampling period corresponding to the entire input point cloud may be $\max(N_i)$, that is, a maximum value of the number of points contained in the at least one slice is determined as the maximum allowable value of the sampling period. It should be noted that when the number of points of the input point cloud is less than or equal to the maximum allowable number of points of the slice, slice division does not need to be performed on the input point cloud at this time, and the input point cloud may be regarded as a slice, that is, the total number of points contained in the input point cloud may be determined as the maximum allowable value of the sampling period, or the number of points contained in the slice is determined as the maximum allowable value of the sampling period.

Furthermore, in some embodiments, the method may further include the following operations. The maximum allowable value of the sampling period is set to be equal to the maximum allowable number of points contained in the slice.

That is, in yet another possible implementation, as to one or more slices of the input point cloud, the maximum allowable number of points contained in the slice may be used to replace the number of points contained in each slice, and at this time, the maximum allowable number of points contained in the slice is determined as the maximum allowable value of the sampling period.

It may be understood that after obtaining the number of points contained in at least one slice, in order to facilitate the decoder to obtain the number of points contained in the at least one slice by parsing the bitstream, according to the embodiment of the disclosure, the number of points contained in the at least one slice may also be written into the bitstream through a first syntax element. Therefore, in some embodiments, the method may further include the following operations.

A value of a first syntax element corresponding to the at least one slice is determined according to the number of points contained in the at least one slice, here, the first syntax element is configured to indicate the number of points contained in the at least one slice.

The value of the first syntax element is written into the bitstream.

It should be noted that the first syntax element may be represented by geom_num_points_minus1, and the first syntax element is configured to indicate the number of points of the slice. In this way, the value of the first syntax element corresponding to the at least one slice may be determined according to the number of points contained in the at least one slice. Specifically, in some embodiments, the operation of determining the value of the first syntax element corresponding to the at least one slice according to the number of points contained in the at least one slice may include the following operations.

The value of the first syntax element is set to be equal to a sum of the number of points contained in the at least one slice and a first constant value, here, the first constant value is a preset integer value.

In a specific embodiment, the first constant value is equal to −1.

Exemplarily, as to the first syntax element, the value of the first syntax element corresponding to the at least one slice may be obtained by performing an operation of subtracting 1 from the number of points contained in the at least one slice.

That is, after obtaining the number of points contained in the at least one slice, the value of the first syntax element corresponding to the at least one slice may be obtained by performing an operation of subtracting 1 from the number of points contained in the at least one slice. In other words, in the decoder, after obtaining the value of the first syntax element, the number of points contained in the at least one slice may be obtained by performing an operation of adding 1 to the value of the first syntax element.

It should also be noted that when the value of the first syntax element is written into the bitstream, the value of the first syntax element needs to be written into a geometric data unit corresponding to the slice, and then written into the bitstream through the geometric data unit, to be transmitted to the decoder. Specifically, in some embodiments, the operation of writing the value of the first syntax element into the bitstream may include the following operations.

The value of the first syntax element is written into a geometric data unit of the at least one slice.

The geometric data unit of the at least one slice is written into the bitstream.

In the embodiment of the disclosure, the value of the first syntax element of each slice is correspondingly written into the geometric data unit of the slice, and then written into the bitstream through the geometric data unit. Subsequently, after the decoder parses the bitstream, the number of points of the at least one slice may be obtained by performing an operation of adding 1 to the value of the first syntax element.

It should also be noted that one or more geometric data units and a plurality of attribute data units may be included in a slice. The attribute data unit depends on a corresponding geometric data unit in the same slice. In the slice, the geometric data unit must appear before any corresponding attribute data unit, and the data units in the slice must be present continuously.

More specifically, as to the first syntax element (geom_num_points_minus1), geom_num_points_minus1 is written in a geometry data unit footer, while the geometry data unit footer is located in the geometric data unit.

It should also be noted that the preset value of the sampling period is preset by the user, to process (such as sample) the input point cloud according to the preset value of the sampling period, so as to generate LOD. In some embodiments, the operation of determining the preset value of the sampling period based on the maximum allowable value of the sampling period may include the following operations.

A candidate input value of the sampling period is acquired.

In response to the candidate input value of the sampling period being less than or equal to the maximum allowable value of the sampling period, the candidate input value of the sampling period is determined as the preset value of the sampling period.

Here, in the encoder, the user may input the candidate input value of the sampling period according to an actual situation. When the candidate input value of the sampling period is less than or equal to the maximum allowable value of the sampling period, the candidate input value of the sampling period may be determined as the preset value of the sampling period. Furthermore, when the candidate input value of the sampling period is greater than the maximum allowable value of the sampling period, the candidate input value of the sampling period is an illegal value at this time, and at this time, the input point cloud is processed by using the candidate input value of the sampling period, to generate LOD, which is not beneficial for system consistency.

In this way, in some embodiments, the operation of determining the preset value of the sampling period based on the maximum allowable value of the sampling period may include the following operations. The preset value of the sampling period is set to be less than or equal to the maximum allowable value of the sampling period.

In other words, in the embodiment of the disclosure, the preset value of the sampling period is less than or equal to the maximum allowable value of the sampling period, to enhance system consistency.

It may be understood that the sampling period may be represented by a second syntax element (sampling_period_minus2). In this way, as to the second syntax element, the embodiment of the disclosure is also related to a maximum allowable value of the second syntax element and a preset value of the second syntax element.

In some embodiments, the method may further include the following operations.

A maximum allowable value of a second syntax element is determined based on the maximum allowable value of the sampling period, here, the second syntax element is configured to indicate a sampling period when the input point cloud is subjected to LOD division.

It should be noted that the maximum allowable value of the second syntax element may be determined according to the maximum allowable value of the sampling period. In a specific embodiment, the operation of determining the maximum allowable value of the second syntax element based on the maximum allowable value of the sampling period may include the following operations.

The maximum allowable value of the second syntax element is set to be equal to a sum of the maximum allowable value of the sampling period and a second constant value, here, the second constant value is a preset integer value.

In a specific embodiment, the second constant value is equal to −2.

Exemplarily, as to the second syntax element, the maximum allowable value of the second syntax element may be obtained by performing an operation of subtracting 2 from the maximum allowable value of the sampling period.

In another specific embodiment, the operation of determining the maximum allowable value of the second syntax element based on the maximum allowable value of the sampling period may include the following operations.

The maximum allowable value of the second syntax element is set to be equal to the maximum allowable value of the sampling period.

Briefly speaking, the maximum allowable value of the second syntax element may be obtained by subtracting 2 from the maximum allowable value of the sampling period, or the maximum allowable value of the sampling period may be directly determined as the maximum allowable value of the second syntax element.

Furthermore, in some embodiments, the operation of writing the preset value of the sampling period into the bitstream may include the following operations.

A value of a second syntax element is determined based on the preset value of the sampling period.

The value of the second syntax element is written into the bitstream.

It should be noted that after obtaining the preset value of the sampling period, the value of the second syntax element may be determined according to the preset value of the sampling period, and then the value of the second syntax element is written into the bitstream.

It should also be noted that the value of the second syntax element may be placed in an attribute parameter set (APS), and then written into the bitstream through APS. In some embodiments, the operation of writing the preset value of the sampling period into the bitstream may include the following operations.

A value of a second syntax element is determined based on the preset value of the sampling period.

The value of the second syntax element is written into APS, and APS is written into the bitstream.

That is, after the value of the second syntax element is determined according to the preset value of the sampling period, the value of the second syntax element may be written into APS, and then APS is written into the bitstream. Subsequently, after the decoder parses the bitstream, APS is acquired, and then the value of the first syntax element is obtained from APS, so that the preset value of the sampling period may be obtained.

In some embodiments, the value of the second syntax element is less than or equal to a maximum allowable value of the second syntax element.

In some embodiments, the operation of determining the value of the second syntax element based on the preset value of the sampling period may include the following operations.

The value of the second syntax element is set to be equal to a sum of the preset value of the sampling period and a third constant value, here, the third constant value is a preset integer value.

In a specific embodiment, the third constant value is equal to −2.

Exemplarily, as to the second syntax element, the value of the second syntax element may be obtained by subtracting 2 from a set value of the sampling period. For example, when the preset value of the sampling period is 4, it is determined that the value of the second syntax element is equal to 2.

Besides, in some embodiments, the operation of writing the value of the second syntax element into the bitstream may include the following operations.

A first bit number corresponding to the second syntax element in the bitstream is determined according to the maximum allowable value of the sampling period.

The value of the second syntax element is converted into a binary bit string of the first bit number, and the binary bit string of the first bit number is written into the bitstream.

In the embodiment of the disclosure, the first bit number is set to be equal to or greater than a minimum integer value of a logarithm of the maximum allowable value of the sampling period based on 2.

That is, after determining the maximum allowable value of the sampling period, a first bit number M corresponding to the second syntax element in the bitstream is determined first. In a possible implementation, M may be a minimum integer value which is greater than a logarithmic value based on 2, of the maximum allowable value of the sampling period. In this way, the value of the second syntax element may be converted into M binary bit strings, and the M binary bit strings are written into the bitstream.

Exemplarily, it is assumed that the maximum allowable value of the sampling period is N (here, "N" represents the number of points of the input point cloud), a maximum allowable value of sampling_period_minus2 may be N−2. In the embodiment of the disclosure, a minimum value of the sampling period is 2, then 2≤T≤N, and T represents the sampling period. At this time, a value of sampling_period_minus2 may be located in an interval of [0, N−2]. Furthermore, the value of sampling_period_minus2 is converted into M binary bit strings, and then the M binary bit strings are written into the bitstream.

Furthermore, the input point cloud may be one or more slices, and a maximum allowable number of points specified by the slice is represented by "Max points in a slice". Then, "Max points in a slice" in G-PCC may be used to replace the number of points in each slice, so that the value range of the syntax element sampling_period_minus2 may be fixed. For example, it is assumed that "Max points in a slice" in G-PCC is 1100000, then the value range of sampling_period_minus2 may be specified as [0, "Max points in a slice"−2], or since all the values of the syntax element are values greater than or equal to zero, the value range may also be simply written as "Max points in a slice". In this way, according to the embodiment of the disclosure, a maximum sampling period of the point cloud may be adaptively determined according to contents of the point cloud, the value range of the syntax element sampling_period_minus2 may be explicitly specified, and the sampling period set by the user may be checked in the encoder, so that system consistency is enhanced, while encoding and decoding performance may be improved.

In operation S304, the input point cloud is processed according to the preset value of the sampling period and the geometric information, to obtain at least one refinement layer and at least one detail layer.

It should be noted that in a possible implementation, a process of performing LOD division on the input point cloud based on Morton codes is implemented as follows.

First, it is assumed that a variable $(p_i)_{i=1,\ldots,N}$ saves an original input point cloud, and a variable $(M_i)_{i=1,\ldots,N}$ is a Morton value associated with each point. D0 and ρ are set as two initial parameters set by the user respectively, and are used as distance threshold parameters during LOD division, here, ρ>1. A specific method for calculating Morton codes is described as follows. As to each component, 3D coordinate is represented by d-bit binary number, three components thereof may represent as shown in formula (1):

$$x = \sum_{l=1}^{d} 2^{d-l} x_l,\ y = \sum_{l=1}^{d} 2^{d-l} y_l,\ z = \sum_{l=1}^{d} 2^{d-l} z_l \qquad (1)$$

Here, $x_l, y_l, z_l \in \{0,1\}$ are binary values corresponding to highest bits (l=1) to lowest bits (l=d) of x, y, z respectively. The Morton code M crosswise arranges $x_l, y_l, z_l$ sequentially from the highest bits to the lowest bits of x, y, z, and a calculation formula of M is shown in the following formula (2):

$$M = \sum_{l=1}^{d} 2^{3(d-l)}(4x_l + 2y_l + z_l) = \sum_{l'}^{3d} 2^{3d-l'} m_{l'} \qquad (2)$$

Here, $m_{l'} \in \{0,1\}$ are values of a highest bit (l'=1) to a lowest bit (l'=3d) of M respectively. After obtaining the Morton code M of each point in the input point cloud, points in the input point cloud are arranged in ascending order of Morton codes.

In another possible implementation, according to the embodiment of the disclosure, LOD division of the input point cloud may be implemented based on the sampling period. Specifically, after determining the preset value of the sampling period, the input point cloud may be processed (specifically, sampled) according to the preset value of the sampling period and the geometric information, to implement LOD layering, so as to obtain at least one refinement layer and at least one detail layer.

In some embodiments, the operation of processing the input point cloud according to the preset value of the sampling period and the geometric information, to obtain at least one refinement layer and at least one detail layer may include the following operations.

The input point cloud is processed by using the preset value of the sampling period based on the geometric information, to obtain a first refinement layer and a first detail layer.

That is, the input point cloud is processed by using the preset value of the sampling period, to obtain a first refinement layer and a first detail layer of a (i=1)-th layer.

As to other layers other than i=1, the obtained detail layers need to be processed layer-by-layer. For example, as to an i-th layer, the detail layer may be referred to as a target detail layer at this time, and the target detail layer is processed by using the preset value of the sampling period, to obtain a (i+1)-th layer (i.e., a next refinement layer and a next detail layer), until the number of points in the next detail layer is equal to 1 or a preset division level is reached, to stop processing.

In a possible implementation, the number of points in the detail layer being 1 only, may be used as a condition of stopping LOD division. At this time, the method may further include the following operations.

A target detail layer is processed by using the preset value of the sampling period, to obtain a next refinement layer and a next detail layer.

In response to a number of points in the next detail layer being greater than 1, the obtained next detail layer is set as the target detail layer, and execution of processing the target detail layer by using the preset value of the sampling period, to obtain the next refinement layer and the next detail layer is continued, until the number of points in the next detail layer is equal to 1, to stop the execution.

Exemplarily, as to other layers other than i=1, descriptions are made by obtaining the (i+1)-th layer through the i-th layer.

An i-th detail layer is processed by using the preset value of the sampling period, to obtain a (i+1)-th refinement layer and a (i+1)-th detail layer, here, i is an integer greater than zero.

When a number of points in the (i+1)-th detail layer is greater than 1, i+1 is assigned to i, and execution of processing the i-th detail layer by using the preset value of the sampling period, to obtain the (i+1)-th refinement layer and the (i+1)-th detail layer is continued, until the number of points in the (i+1)-th detail layer is equal to 1, to obtain the at least one refinement layer and the at least one detail layer.

In another possible implementation, LOD layering reaching a preset division number of layers, may be used as a condition of stopping LOD division. At this time, the method may further include the following operations.

A target detail layer is processed by using the preset value of the sampling period, to obtain a next refinement layer and a next detail layer, and an operation of adding 1 to a currently division number of layers is performed.

In response to the currently division number of layers being less than a preset division number of layers, the obtained next detail layer is set as the target detail layer, and execution of processing the target detail layer by using the preset value of the sampling period, to obtain the next refinement layer and the next detail layer, and of performing the operation of adding 1 to the currently division number of layers are continued, until the currently division number of layers is equal to the preset division number of layers, to stop the execution.

Exemplarily, as to other layers other than i=1, descriptions are made by obtaining the (i+1)-th layer through the i-th layer.

An i-th detail layer is processed by using the preset value of the sampling period, to obtain a (i+1)-th refinement layer and a (i+1)-th detail layer, and a currently division number of layers is determined as i, here, i is an integer greater than zero.

When i is less than a preset division number of layers, i+1 is assigned to i, and execution of processing the i-th detail layer by using the preset value of the sampling period, to obtain the (i+1)-th refinement layer and the (i+1)-th detail layer is continued, until i is equal to the preset division number of layers, to obtain the at least one refinement layer and the at least one detail layer.

In the embodiment of the disclosure, the input point cloud is required to be an input point cloud obtained after sorting. That is, the input point cloud needs to be sorted first; then, sampling is performed according to the preset value of the sampling period to obtain the first refinement layer and the first detail layer; next, an i-th detail layer is sampled again to obtain an (i+1)-th refinement layer and an (i+1)-th detail layer, here, i is an integer greater than zero; and division is stopped until a number of points in the (i+1)-th detail layer is equal to 1 or the preset division number of layers set by the user is reached.

In some embodiments, the operation of determining the preset value of the sampling period based on the maximum allowable value of the sampling period may include the following operations.

A target preset value of the sampling period corresponding to the target detail layer is determined based on the maximum allowable value of the sampling period.

Correspondingly, the operation of processing the target detail layer by using the preset value of the sampling period, to obtain the next refinement layer and the next detail layer may include the following operations.

The target detail layer is processed by using the target preset value of the sampling period, to obtain the next refinement layer and the next detail layer.

In the embodiment of the disclosure, the target preset value of the sampling period is less than or equal to the maximum allowable value of the sampling period.

It should also be noted that in the foregoing process, the sampling period corresponding to the at least one detail layer may be a fixed sampling period, or may be a variable sampling period. Here, the preset value of the sampling period corresponding to the i-th detail layer may be represented by an i-th preset value of the sampling period. In some embodiments, the method may further include the following operations. The preset value of the sampling period corresponding to the i-th detail layer is set as an i-th preset value of the sampling period, and the i-th preset value of the sampling period is less than or equal to the maximum allowable value of the sampling period.

Furthermore, in some embodiments, the method may further include the following operations.

In response to the i-th preset value of the sampling period being different from a (i+1)-th preset value of the sampling period, it is determined that different detail layers in the at least one detail layer correspond to preset values of different sampling periods.

In response to the i-th preset value of the sampling period being the same as the (i+1)-th preset value of the sampling period, it is determined that different detail layers in the at least one detail layer correspond to the same preset value of the sampling period.

That is, the preset value of the sampling period corresponding to each of the at least one detail layer is less than or equal to the maximum allowable value of the sampling period. Furthermore, different detail layers in the at least one detail layer correspond to preset values of different sampling periods, or may correspond to the preset value of the same sampling period. Generally, when different detail layers in the at least one detail layer correspond to preset values of different sampling periods, the preset value of the sampling period corresponding to the i-th detail layer is greater than the preset value of the sampling period corresponding to the (i+1)-th detail layer, however, it is not specifically limited here.

In other words, the value of the second syntax element corresponding to an idx-th detail layer may be represented by sampling_period_minus2[idx], and the preset value of the sampling period corresponding to a detail level idx (or referred to as an idx-th detail layer) is obtained by adding 2 to sampling_period_minus2[idx]. Here, sampling_period_minus2[idx] is less than or equal to the maximum allowable value of the second syntax element.

In operation S305, the attribute information is encoded by using the at least one refinement layer and the at least one detail layer, to generate a bitstream, and the preset value of the sampling period is written into the bitstream.

It should be noted that after completing LOD division, the attribute information may be encoded by using the at least one refinement layer and the at least one detail layer, which may specifically as follows. A current point is predicted by using points in the encoded detail layer and encoded points in a current refinement layer, to obtain prediction data. Then, difference is calculated by using the prediction data and original data of the current point, to obtain a prediction residual, and the prediction residual is written into the bitstream, so that it may be used by the decoder upon performing point cloud reconstruction subsequently.

Briefly speaking, in the embodiment of the disclosure, the input point cloud is sampled by using the sampling period, to implement LOD division. The method has relatively low complexity, may capture distribution of initial points well, and may predict non-smooth attribute information on an irregular sampled point cloud more effectively. Furthermore, as to the problem of absence of definition on the maximum allowable value of the syntax element sampling_period_minus2, according to the embodiment of the disclosure, the maximum value thereof is also pre-defined as MAX. In the method for generating LOD based on the sampling period, the input point cloud is sorted first, and then the sorted input point cloud is sampled according to the sampling period set by the user, so that even though the sampling period is maximum, the sampling period should not be greater than the number of points of the current point cloud, and a minimum value of the sampling period is 2; at this time, it may be expressed as $2 \leq T \leq N$, here, T is the sampling period and N is the number of points of the input point cloud. Therefore, an interval of sampling_period_minus2 may be defined as 0 to N−2. It should be noted that since the syntax element usually starts from zero at the encoder, the sampling period may be subtracted by 2.

It should also be noted that the syntax element sampling_period_minus2 is located in APS, and it is at a picture level. Since APS has a higher priority, each slice will refer to the syntax element (sampling_period_minus2).

A descriptor of the syntax element sampling_period_minus2 is ue(v). In Common Test Conditions (CTC), the value of sampling_period_minus2 is usually set to 2, which means that the sampling period (i.e., the preset value of the sampling period) set by the user is equal to 4. In another possible implementation, the descriptor of the syntax element may also use u(v), which depends mainly on geom_num_points_minus1, and a descriptor of geom_num_points_minus1 is u(24).

It should also be noted that MAX is not written into the bitstream, and is mainly obtained by using related contents of the input point cloud (such as a number of points of the input point cloud, a number of points of a slice, a maximum allowable number of points of the slice, or the like), and is only used to check system consistency. The encoder only writes the preset value of the sampling period (i.e., the value of sampling_period_minus2) into the bitstream.

Furthermore, in G-PCC, when the number of points of the input point cloud is greater than a variable Max_points_in_a_slice, the input point cloud may be divided into a plurality of slices. At this time, when MAX directly uses the number of points of the input point cloud, it may be a very large value, which means that it does not play a role of limitation. In this way, after slice division is performed on the input point cloud, the maximum value (i.e., the maximum allowable value) of the corresponding sampling period is the number ($N_i$) of points in each slice. Therefore, the maximum value of the sampling period corresponding to the entire input point cloud is $\max\{N_i\}$.

As to each slice, Geometry Slice Header (GSH) corresponding to a slice includes a syntax element to represent a number of points of the current slice, and the syntax element is geom_num_points_minus1. Specifically, geom_num_points_minus1 is written in geometry data unit footer, while the geometry data unit footer is located in the geometric data unit. No matter APS is before or after GSH, the number of points of the slice cannot be used to represent the value of sampling_period_minus2, since the number of points of the slice is only used to limit the maximum allowable value of sampling_period_minus2.

In a draft text, it is defined that "sampling_period_minus2 [idx] plus 2 may represent a value of a sampling period of a detail level idx, and the value of the sampling period is located in an interval of 0 to xx". In the embodiment of the disclosure, the value of the sampling period may be abbreviated as "less than or equal to MAX". In this way, according to the embodiment of the disclosure, a maximum sampling period of the point cloud may be adaptively determined according to contents of the point cloud, and the value range of the syntax element sampling_period_minus2 may be explicitly specified.

The embodiment provides a point cloud encoding method, in which geometric information and attribute information of an input point cloud are acquired; a maximum allowable value of a sampling period when the input point cloud is subjected to LOD division, is determined; a preset value of the sampling period is determined based on the maximum allowable value of the sampling period; the input point cloud is processed according to the preset value of the sampling period and the geometric information, to obtain at least one refinement layer and at least one detail layer; the attribute information is encoded by using the at least one refinement layer and the at least one detail layer, to generate a bitstream, and the preset value of the sampling period is written into the bitstream. In this way, since a maximum value of the sampling period is specified in the encoder, it may ensure that the preset value of the sampling period does not exceed the maximum value of the sampling period, so that when a series of processing are performed on the point cloud by using the preset value of the sampling period, system consistency may be enhanced, and encoding efficiencies may also be improved, to improve encoding performance.

In another embodiment of the disclosure, the point cloud decoding method provided in the embodiment of the disclosure is applied to a video decoding device, i.e., a G-PCC decoder which may be abbreviated as a decoder. Functions implemented by the method may be implemented by a second processor in the decoder calling a computer program, of course, the computer program may be stored in a second memory, and it may be seen that the decoder includes at least the second processor and the second memory.

Figure 4:
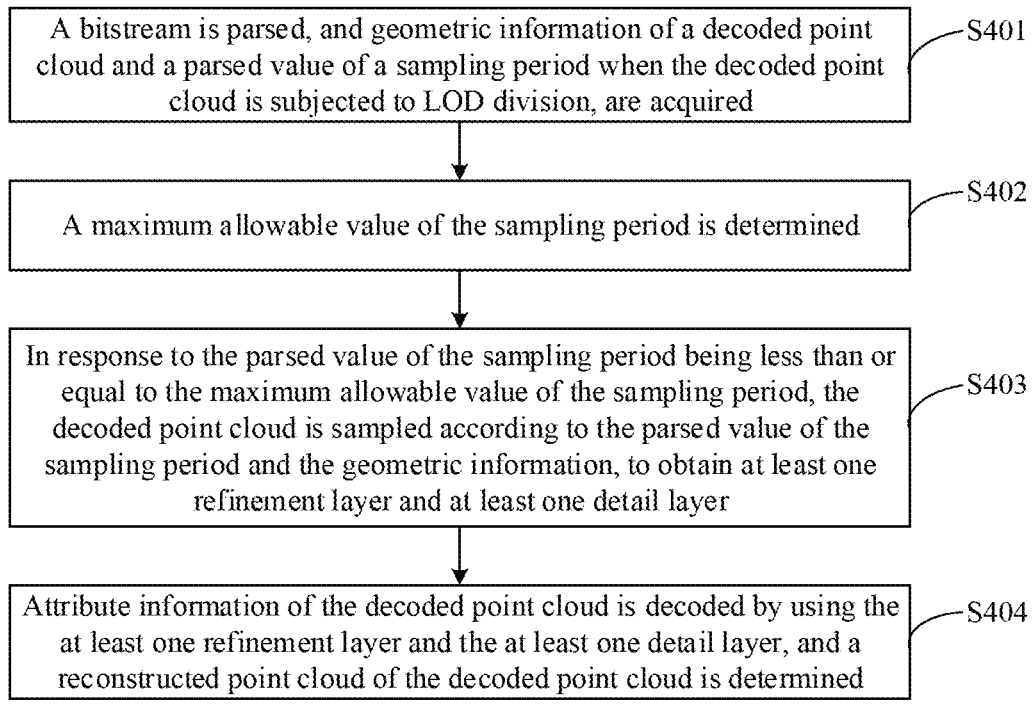
FIG. 4 is a schematic flowchart of a point cloud decoding method according to an embodiment of the disclosure.

With reference to FIG. 4, there is shown a schematic flowchart of a point cloud decoding method according to an embodiment of the disclosure. As shown in FIG. 4, the method may include the following operations S401 to S404.

In operation S401, a bitstream is parsed, and geometric information of a decoded point cloud and a parsed value of a sampling period when the decoded point cloud is subjected to LOD division, are determined.

It should be noted that points in the point cloud may be all points in the point cloud, or may be a part of the points in the point cloud, and these points are relatively centralized in space.

It should also be noted that based on the frame of G-PCC decoder shown in FIG. 1B, the method according to the embodiment of the disclosure is mainly applied to the "Generating LOD" part, and as to the problem of the sampling period of LOD in the current related art, a maximum value of the sampling period may be adaptively calculated according to contents of the point cloud, to ensure system consistency.

Here, the decoded point cloud may be obtained by parsing the bitstream, and the decoded point cloud may be understood as point cloud data which needs to be layered, such as point cloud data for forming a 3D video, or the like. The decoded point cloud may include the geometric information and attribute information. The geometric information includes a normal vector of the point cloud, a curvature, a density of the point cloud, a surface roughness of the point cloud, a center of gravity of the point cloud, a weight center of gravity of the point cloud, a covariance of the point cloud, a cross covariance of the point cloud, or the like. The attribute information includes: square of a division distance of the input point cloud, a total division number of layers, information of color space, spatial resolution, precision of point position, a surface normal vector, or the like. After decoding of the geometric information, decoding of the attribute information may involve LOD layering at this time, and the layering may be implemented according to Morton codes, or may be implemented according to the sampling period. In the embodiment of the disclosure, LOD layering is implemented by using the sampling period.

It may be understood that the sampling period may be represented by a second syntax element (sampling_period_minus2). In this way, in some embodiments, the operation of parsing the bitstream, and acquiring the parsed value of the sampling period may include the following operations.

The bitstream is parsed and a value of a second syntax element is determined, here, the second syntax element is configured to indicate a sampling period when the decoded point cloud is subjected to LOD division.

The parsed value of the sampling period is determined according to the value of the second syntax element.

It should be noted that since the encoder writes the value of the second syntax element into the bitstream, the value of the second syntax element may be acquired by parsing the bitstream in the decoder; and then the parsed value of the sampling period may be determined according to the value of the second syntax element.

It should also be noted that the encoder writes the value of the second syntax element into APS, and then writes APS into the bitstream. Therefore, in some embodiments, the operation of parsing the bitstream and determining the value of the second syntax element may include the following operations.

The bitstream is parsed and APS is acquired.

The value of the second syntax element is determined from APS.

That is, the decoder may acquire APS by parsing the bitstream; then may acquire the value of the second syntax element from APS; and then may determine the parsed value of the sampling period according to the value of the second syntax element.

That is, after the value of the second syntax element is obtained by parsing the bitstream, the parsed value of the sampling period may be determined, and the decoded point cloud may be subsequently processed (such as sampled) according to the parsed value of the sampling period, to implement LOD layering.

In operation S402, a maximum allowable value of the sampling period is determined.

It should be noted that in a process of implementing LOD layering by using the sampling period, not only the parsed value of the sampling period needs to be determined, but also the maximum allowable value of the sampling period needs to be determined, to ensure that the parsed value of the sampling period does not exceed the maximum allowable value of the sampling period, thereby enhancing system consistency.

It should also be noted that the maximum allowable value of the sampling period is mainly related to related contents of the decoded point cloud, such as a number of points contained in the decoded point cloud, a number of points contained in a slice, a maximum allowable number of points contained in the slice, or the like.

In some embodiments, the operation of determining the maximum allowable value of the sampling period may include the following operations.

A maximum allowable number of points contained in a slice, is acquired.

The maximum allowable value of the sampling period is determined according to the maximum allowable number of points contained in the slice.

In a specific embodiment, the operation of determining the maximum allowable value of the sampling period according to the maximum allowable number of points contained in the slice may include the following operations.

The maximum allowable value of the sampling period is set to be equal to the maximum allowable number of points contained in the slice.

That is, in a possible implementation, the decoder has included the maximum allowable number of points contained in the slice; then, as to one or more slices of the decoded point cloud, the maximum allowable number of points contained in the slice may be used to replace the number of points in each slice, and at this time, the maximum allowable number of points contained in the slice may be determined as the maximum allowable value of the sampling period.

In some embodiments, the operation of determining the maximum allowable value of the sampling period may include the following operations.

The bitstream is parsed and a value of a first syntax element corresponding to at least one slice is determined, here, the first syntax element is configured to indicate a number of points contained in the at least one slice.

The number of points contained in the at least one slice is determined according to the value of the first syntax element.

The maximum allowable value of the sampling period is determined according to the number of points contained in the at least one slice.

In a specific embodiment, the operation of determining the maximum allowable value of the sampling period according to the number of points contained in the at least one slice may include the following operations.

A maximum value is selected from the number of points, and the maximum value is determined as the maximum allowable value of the sampling period.

It should be noted that the first syntax element may be represented by geom_num_points_minus1, and the first syntax element is configured to indicate the number of points contained in the slice. In another possible implementation, since the encoder writes the number of points contained in at least one slice into the bitstream by the value of the first syntax element, after obtaining the number of points contained in the at least one slice; in this way, the value of the first syntax element may be acquired by parsing the bitstream in the decoder, so that the number of points contained in the at least one slice (which may be represented by $N_i$) may be determined; therefore, the maximum allowable value of the sampling period corresponding to the entire decoded point cloud may be $\max(N_i)$, that is, a maximum value of the number of points of the at least one slice is determined as the maximum allowable value of the sampling period. It should be noted that when the number of points of the decoded point cloud is less than or equal to the maximum allowable number of points of the slice, slice division does not need to be performed on the decoded point cloud at this time, and the decoded point cloud may be regarded as a slice, that is, the number of points contained in the slice may be determined as the maximum allowable value of the sampling period.

Furthermore, in some embodiments, the operation of parsing the bitstream and acquiring the value of the first syntax element corresponding to at least one slice may include the following operations.

The bitstream is parsed and a geometric data unit of the at least one slice is acquired.

The value of the first syntax element corresponding to the at least one slice is determined from the geometric data unit of the at least one slice.

It should also be noted that the geometric data unit of the at least one slice may be acquired by parsing the bitstream in the decoder; and then, the value of the first syntax element corresponding to the at least one slice is acquired from the geometric data unit of the at least one slice, so that the number of points contained in the at least one slice may be determined.

It should also be noted that one or more geometric data units and a plurality of attribute data units may be included in a slice. The attribute data unit depends on a corresponding geometric data unit in the same slice. In the slice, the geometric data unit must appear before any corresponding attribute data unit, and the data units in the slice must be present continuously.

More specifically, as to the first syntax element (geom_num_points_minus1), geom_num_points_minus1 is written in a geometry data unit footer, while the geometry data unit footer is located in the geometry data unit.

Furthermore, in some embodiments, the operation of determining the number of points contained in the at least one slice according to the value of the first syntax element may include the following operations.

A value of the number of points contained in the at least one slice is set to be equal to a sum of the value of the first syntax element and a first constant value, here, the first constant value is a preset integer value.

In a specific embodiment, the first constant value is equal to 1.

Exemplarily, as to the first syntax element, the number of points contained in the at least one slice may be obtained by performing an operation of adding 1 to the value of the first syntax element.

That is, in the decoder, after obtaining the value of the first syntax element, the number of points contained in the at least one slice may be obtained by performing an operation of adding 1 to the value of the first syntax element; then, a maximum value is selected from the number of points, and the selected maximum value is determined as the maximum allowable value of the sampling period.

In some embodiments, the operation of determining the maximum allowable value of the sampling period may include the following operations.

The bitstream is parsed and a total number of points contained in the decoded point cloud is determined.

The maximum allowable value of the sampling period is determined according to the total number of points contained in the decoded point cloud.

Furthermore, the operation of parsing the bitstream and determining the total number of points contained in the decoded point cloud may include the following operations.

The bitstream is parsed, and a value of a first syntax element corresponding to at least one slice is determined.

The total number of points contained in the decoded point cloud is determined according to the value of the first syntax element corresponding to at least one slice.

That is, after parsing the bitstream and obtaining the value of the first syntax element corresponding to the at least one slice, the number of points contained in the at least one slice may be determined. When the point cloud is not divided, that is, there is only one slice, the number of points contained in the decoded slice may be determined as the total number of points contained in the decoded point cloud; and when the point cloud is divided, that is, there are at least two slices, the number of points contained in the decoded at least two slices may be summed, and the calculation result is determined as the total number of points contained in the decoded point cloud.

In a specific embodiment, the operation of determining the maximum allowable value of the sampling period according to the total number of points contained in the decoded point cloud may include the following operations. The total number of points contained in the decoded point cloud is determined as the maximum allowable value of the sampling period.

That is, in yet another possible implementation, the total number of points contained in the decoded point cloud may also be determined by parsing the bitstream in the decoder, and then the total number of points contained in the decoded point cloud is determined as the maximum allowable value of the sampling period. At this time, the preset value of the sampling period will be less than or equal to the total number of points contained in the decoded point cloud.

It should also be noted that a conformance parameter is configured to characterize its own attribute of the point cloud bitstream, and includes at least one of the following parameters: profile, tier or level, or may be configured to determine the maximum allowable value of the sampling period. Specifically, in some embodiments, the operation of determining the maximum allowable value of the sampling period may include the following operations.

The bitstream is parsed and a conformance parameter is determined, here, the conformance parameter includes at least one of a profile parameter, a tier parameter, or a level parameter.

The maximum allowable value of the sampling period is determined according to the conformance parameter.

In a specific embodiment, the operation of determining the maximum allowable value of the sampling period according to the conformance parameter may include the following operations. The maximum allowable value of the sampling period is set to be equal to a preset value corresponding to the conformance parameter.

That is, in yet another possible implementation, according to the embodiment of the disclosure, a conformance parameter of the input point cloud may be determined, and then the maximum allowable value of the sampling period is determined according to the conformance parameter of the input point cloud. Here, in the embodiment of the disclosure, the maximum allowable value of the sampling period may be set to be equal to a preset value corresponding to the conformance parameter.

In some embodiments, the operation of determining the maximum allowable value of the sampling period may include the following operation.

The maximum allowable value of the sampling period is set as a preset constant value.

That is, in yet another possible implementation, according to the embodiment of the disclosure, the maximum allowable value of the sampling period may be set as the preset constant value. Here, the preset constant value is an integer value greater than zero.

In the embodiment of the disclosure, the sampling period may be the maximum allowable value or the preset value. Therefore, as to the second syntax element, a maximum allowable value of the second syntax element and a preset value of the second syntax element may also be involved in the embodiment of the disclosure.

In some embodiments, the method may further include the following operations.

A maximum allowable value of the second syntax element is determined based on the maximum allowable value of the sampling period.

It should be noted that the maximum allowable value of the second syntax element may be determined according to the maximum allowable value of the sampling period. In a specific embodiment, the operation of determining the maximum allowable value of the second syntax element based on the maximum allowable value of the sampling period may include the following operations.

The maximum allowable value of the second syntax element is set to be equal to a sum of the maximum allowable value of the sampling period and a second constant value, here, the second constant value is a preset integer value.

In a specific embodiment, the second constant value is equal to −2.

Exemplarily, as to the second syntax element, the maximum allowable value of the second syntax element may be obtained by performing an operation of subtracting 2 from the maximum allowable value of the sampling period.

In another specific embodiment, the operation of determining the maximum allowable value of the second syntax element based on the maximum allowable value of the sampling period may include the following operations.

The maximum allowable value of the second syntax element is set to be equal to the maximum allowable value of the sampling period.

Briefly speaking, the maximum allowable value of the second syntax element may be obtained by subtracting 2 from the maximum allowable value of the sampling period, or the maximum allowable value of the sampling period may be directly determined as the maximum allowable value of the second syntax element.

It should also be noted that the value of the second syntax element is less than or equal to the maximum allowable value of the second syntax element.

In some embodiments, the operation of determining the parsed value of the sampling period according to the value of the second syntax element may include the following operations.

The parsed value of the sampling period is set to be equal to a sum of the value of the second syntax element and a third constant value, here, the third constant value is a preset integer value.

In a specific embodiment, the third constant value is equal to 2.

Exemplarily, as to the second syntax element, the preset value of the sampling period may be obtained by adding 2 to the value of the second syntax element. For example, when the value of the second syntax element is 2, the preset value of the sampling period is equal to 4.

Besides, in some embodiments, the operation of parsing the bitstream and determining the value of the second syntax element may include the following operations.

A first bit number corresponding to the second syntax element in the bitstream is determined according to the maximum allowable value of the sampling period.

In the embodiment of the disclosure, the first bit number is set to be equal to or greater than a minimum integer value of a logarithm of the maximum allowable value of the sampling period based on 2.

Furthermore, the method may further include the following operations.

A binary bit string, a number of bits in the binary bit string being equal to the first bit number, is read from the bitstream.

The value of the second syntax element is set to be equal to an unsigned integer corresponding to the binary bit string.

That is, after determining the maximum allowable value of the sampling period, a first bit number M corresponding to the second syntax element in the bitstream is determined first. In a possible implementation, M may be a minimum integer value which is greater than a logarithmic value based on 2, of the maximum allowable value of the sampling period. In this way, M binary bit strings may be read from the bitstream, and the value of the second syntax element is set to be equal to an unsigned integer corresponding to M binary bit strings.

Exemplarily, it is assumed that the maximum allowable value of the sampling period is N (here, "N" represents the number of points of the input point cloud), a maximum allowable value of sampling_period_minus2 may be N−2. In the embodiment of the disclosure, a minimum value of the sampling period is 2, then 2≤T≤N, and T represents the sampling period. At this time, a value of sampling_period_minus2 may be located in an interval of [0, N−2]. When the bitstream is parsed and the acquired value of sampling_period_minus2 is not located in the interval of [0, N−2], it indicates that error occurs to the parsing, or the parsed sampling period is not available; at this time, the input point cloud is processed by using a candidate input value of the sampling period, to generate LOD, which is not beneficial for system consistency.

In the embodiment of the disclosure, the decoded point cloud may be one or more slices, and a maximum allowable number of points specified by the slice is represented by "Max points in a slice". Then, "Max points in a slice" in G-PCC may be used to replace the number of points in each slice, so that a value range of the syntax element sampling_period_minus2 may be fixed. For example, it is assumed that "Max points in a slice" in G-PCC is 1100000, then the value range of sampling_period_minus2 may be specified as [0, "Max points in a slice"−2], or since all the values of the syntax element are values greater than or equal to zero, the value range may also be simply written as "Max points in a slice". In this way, according to the embodiment of the disclosure, a maximum sampling period of the point cloud may be adaptively determined according to contents of the point cloud, the value range of the syntax element sampling_period_minus2 may be explicitly specified, and the sampling period set by the user may be checked in the encoder, so that system consistency is enhanced, while encoding and decoding performance may be improved.

In operation S403, in response to the parsed value of the sampling period being less than or equal to the maximum allowable value of the sampling period, the decoded point cloud is processed according to the parsed value of the sampling period and the geometric information, to obtain at least one refinement layer and at least one detail layer.

It should be noted that in order to enhance system consistency, the embodiment of the disclosure needs to meet the following conditions: the parsed value of the sampling period is less than or equal to the maximum allowable value of the sampling period; and then the decoded point cloud may be processed according to the parsed value of the sampling period and the geometric information, to obtain at least one refinement layer and at least one detail layer.

It should also be noted that according to the embodiment of the disclosure, LOD division may be performed on the decoded point cloud based on the sampling period. Specifically, after determining the parsed value of the sampling period, the decoded point cloud may be processed (specifically, sampled) according to the parsed value of the sampling period and the geometric information, to implement LOD layering, so as to obtain at least one refinement layer and at least one detail layer.

In some embodiments, the operation of processing the decoded point cloud according to the parsed value of the sampling period and the geometric information, to obtain at least one refinement layer and at least one detail layer may include the following operations.

The decoded point cloud is processed by using the parsed value of the sampling period based on the geometric information, to obtain a first refinement layer and a first detail layer.

That is, the decoded point cloud is processed by using the preset value of the sampling period, to obtain a first refinement layer and a first detail layer of a (i=1)-th layer.

As to other layers other than i=1, the obtained detail layers need to be processed layer-by-layer. For example, as to an i-th layer, the detail layer may be referred to as a target detail layer at this time, and the target detail layer is processed by using the parsed value of the sampling period, to obtain a (i+1)-th layer (i.e., a next refinement layer and a next detail layer), until the number of points in the next detail layer is equal to 1 or a preset division level is reached, to stop processing.

In a possible implementation, the number of points in the detail layer being 1 only, may be used as a condition of stopping LOD division. At this time, the method may further include the following operations.

A target detail layer is processed by using the parsed value of the sampling period, to obtain a next refinement layer and a next detail layer.

In response to a number of points in the next detail layer being greater than 1, the obtained next detail layer is set as the target detail layer, and execution of processing the target detail layer by using the parsed value of the sampling period, to obtain the next refinement layer and the next detail layer is continued, until the number of points in the next detail layer is equal to 1, to stop the execution.

Exemplarily, as to other layers other than i=1, descriptions are made by obtaining the (i+1)-th layer through the i-th layer.

An i-th detail layer is processed by using the parsed value of the sampling period, to obtain a (i+1)-th refinement layer and a (i+1)-th detail layer, here, i is an integer greater than zero.

When a number of points in the (i+1)-th detail layer is greater than 1, i+1 is assigned to i, and execution of processing the i-th detail layer by using the preset value of the sampling period, to obtain the (i+1)-th refinement layer and the (i+1)-th detail layer is continued, until the number of points in the (i+1)-th detail layer is equal to 1, to obtain the at least one refinement layer and the at least one detail layer.

In another possible implementation, LOD layering reaching a preset division number of layers, may be used as a condition of stopping LOD division. At this time, the method may further include the following operations.

A target detail layer is processed by using the parsed value of the sampling period, to obtain a next refinement layer and a next detail layer, and an operation of adding 1 to a currently division number of layers is performed.

In response to the currently division number of layers being less than a preset division number of layers, the obtained next detail layer is set as the target detail layer, and execution of processing the target detail layer by using the parsed value of the sampling period, to obtain the next refinement layer and the next detail layer, and of performing the operation of adding 1 to the currently division number of layers are continued, until the currently division number of layers is equal to the preset division number of layers, to stop the execution.

Exemplarily, as to other layers other than i=1, descriptions are made by obtaining the (i+1)-th layer through the i-th layer. An i-th detail layer is processed by using the preset value of the sampling period, to obtain a (i+1)-th refinement layer and a (i+1)-th detail layer, here, i is an integer greater than zero.

When i is less than a preset division number of layers, i+1 is assigned to i, and execution of processing the i-th detail layer by using the preset value of the sampling period, to obtain the (i+1)-th refinement layer and the (i+1)-th detail layer is continued, until i is equal to the preset division number of layers, to obtain the at least one refinement layer and the at least one detail layer.

In the embodiment of the disclosure, the decoded point cloud is required to be a decoded point cloud obtained after sorting. That is, the decoded point cloud needs to be sorted first; then, sampling is performed according to the parsed value of the sampling period to obtain the first refinement layer and the first detail layer; next, an i-th detail layer is sampled again to obtain an (i+1)-th refinement layer and an (i+1)-th detail layer, here, i is an integer greater than zero; and division is stopped until a number of points in the (i+1)-th detail layer is equal to 1 or the preset division number of layers set by the user is reached.

In G-PCC standard, LOD Generation is as follows.

It is assumed that a current detail layer corresponds to LodLv1, a next detail layer after output (down-sampling) corresponds to LodLv1+1. Here, LodLv1=0, . . . ,num_detail_levels_minus1, and inLodSize is equivalent to lodSizes[LodLv1].

Here, when the current detail layer (or referred to as "input detail level") contains a single point, or a predetermined division number of layers (i.e., a preset division number of layers) has been constructed, no further processing will be performed.

```
if    (inLodSize==1    ||    LodLv1==num_detail_
    levels_minus1) {
    OutLodSize=0
    for (i=0; i<InLodSize;i++)
        OutDiffIdxs[i]=InLodIdxs[i]
}
```

Otherwise, down-sampling is performed by using one of the following partitioning processes:

When lod_scalability_enabled_flag is equal to 1, octree-based down-sampling is performed.

Otherwise, when lod_regular_sampling_enabled_flag is equal to 1, periodic sampling is performed.

Otherwise, distance-based down-sampling is performed.

Process of Periodic Sampling:

A sampling period of the current detail layer is: sampingPeriod=2+sampling_period_minus2[LodLv1].

An input point is assigned to a next detail layer and a next refinement layer according to an index in an input detail level.

```
OutLodSize=OutDiffSize=0
for (i=0; i<InLodSize;i++)
    if (i % samplingPeriod)
        OutDiffIdxs [OutDiffSize++]=InLodIdxs[i]
    else
        OutLodIdxs [OutLodSize++]=InLodIdxs[i]
}
```

It should be noted that, specific parameter definitions and specific processes in the foregoing contents of the G-PCC standard may refer to text of the standard for the details, and are not elaborated here.

In some embodiments, the operation of parsing the bitstream and determining the parsed value of the sampling period may include the following operations.

The bitstream is parsed, and a target parsed value of the sampling period corresponding to the target detail layer is determined.

Correspondingly, the operation of processing the target detail layer by using the parsed value of the sampling period, to obtain the next refinement layer and the next detail layer may include the following operations.

The target detail layer is processed by using the target parsed value of the sampling period, to obtain the next refinement layer and the next detail layer.

In the embodiment of the disclosure, the target parsed value of the sampling period is less than or equal to the maximum allowable value of the sampling period.

It should also be noted that in the foregoing process, the sampling period corresponding to the at least one detail layer may be a fixed sampling period, or may be a variable sampling period. Here, the parsed value of the sampling period corresponding to the i-th detail layer may be represented by an i-th parsed value of the sampling period. In some embodiments, the operation of parsing the bitstream and determining the parsed value of the sampling period may include the following operations.

The bitstream is parsed, and an i-th parsed value of the sampling period corresponding to the i-th detail layer is determined, here, i is an integer greater than zero.

Correspondingly, the operation of processing the i-th detail layer by using the parsed value of the sampling period, to obtain an (i+1)-th refinement layer and an (i+1)-th detail layer may include the following operations. The i-th detail layer by using the i-th parsed value of the sampling period corresponding to the i-th detail layer, to obtain the (i+1)-th refinement layer and the (i+1)-th detail layer.

Furthermore, in some embodiments, the i-th parsed value of the sampling period is less than or equal to the maximum allowable value of the sampling period.

It should also be noted that the preset value of the sampling period corresponding to each of the at least one detail layer is less than or equal to the maximum allowable value of the sampling period. Furthermore, different detail layers in the at least one detail layer correspond to preset values of different sampling periods, or may correspond to the preset value of the same sampling period. Generally, when different detail layers in the at least one detail layer correspond to preset values of different sampling periods, the preset value of the sampling period corresponding to the i-th detail layer is greater than the preset value of the sampling period corresponding to the (i+1)-th detail layer, however, it is not specifically limited here.

In other words, the value of the second syntax element corresponding to an idx-th detail layer may be represented by sampling_period_minus2[idx], and the preset value of the sampling period corresponding to a detail level idx (or referred to as an idx-th detail layer) is obtained by adding 2 to sampling_period_minus2[idx]. Here, sampling_period_minus2[idx] is less than or equal to the maximum allowable value of the second syntax element.

In operation S404, attribute information of the decoded point cloud is decoded by using the at least one refinement layer and the at least one detail layer, and a reconstructed point cloud of the decoded point cloud is determined.

It should be noted that after completing LOD division, the attribute information may be decoded by using the at least one refinement layer and the at least one detail layer, which may specifically as follows. A current point is predicted by using reconstructed points in the decoded detail layer and decoded reconstructed points in a current refinement layer, to obtain prediction data. Meanwhile, a prediction residual is obtained by parsing the bitstream, and the prediction data and the prediction residual are added, to obtain reconstructed data (i.e., a reconstructed point) of the current point, so as to reconstruct and obtain the reconstructed point cloud.

Briefly speaking, in the embodiment of the disclosure, the decoded point cloud is sampled by using the sampling period, to implement LOD division. The method has relatively low complexity, may capture distribution of initial points well, and may predict non-smooth attribute information on an irregular sampled point cloud more effectively. Furthermore, as to the problem of absence of definition on the maximum allowable value of the syntax element sampling_period_minus2, according to the embodiment of the disclosure, the maximum value thereof is also pre-defined as MAX. In the method for generating LOD based on the sampling period, the decoded point cloud is sorted first, and then the sorted input point cloud is sampled according to the sampling period set by the user, so that even though the sampling period is maximum, the sampling period should not be greater than the number of points of the current point cloud, and a minimum value of the sampling period is 2; at this time, it may be expressed as $2 \leq T \leq N$, here, T is the sampling period and N is the number of points of the decoded point cloud. Therefore, an interval of sampling_period_minus2 may be defined as 0 to N−2. It should be noted that since the syntax element usually starts from zero at the decoder, the sampling period may be subtracted by 2.

It should also be noted that the syntax element sampling_period_minus2 is located in APS, and it is at a picture level. Since APS has a higher priority, each slice will refer to the syntax element (sampling_period_minus2).

Furthermore, MAX is not written into the bitstream, and is mainly obtained by using related contents of the decoded point cloud (such as a number of points of the input point cloud, a number of points of a slice, a maximum allowable number of points of the slice, or the like), and is only used to check system consistency. The encoder only writes the preset value of the sampling period (i.e., the value of sampling_period_minus2) into the bitstream.

In G-PCC, the decoded point cloud may be divided into a plurality of slices. At this time, when MAX directly uses the number of points of the decoded point cloud, it may be a very large value, which means that it does not play a role of limitation. In this way, the maximum value (i.e., the maximum allowable value) of sampling periods corresponding to the plurality of slices is the number ($N_i$) of points in each slice. Therefore, the maximum value of the sampling period corresponding to the entire decoded point cloud is $\max\{N_i\}$. Furthermore, as to each slice, GSH includes a syntax element to represent a number of points of the current slice, and the syntax element is geom_num_points_minus1. Specifically, geom_num_points_minus1 is written in geometry data unit footer, while the geometry data unit footer is located in the geometric data unit. No matter APS is before or after GSH, the number of points of the slice cannot be used to represent the value of sampling_period_minus2, since the number of points of the slice is only used to limit the maximum allowable value of sampling_period_minus2.

It should also be noted that in a draft text, it is defined that "sampling_period_minus2[idx] plus 2 may represent a value of a sampling period of a detail level idx, and the value of the sampling period is located in an interval of 0 to xx". In the embodiment of the disclosure, the value of the sampling period may be abbreviated as "less than or equal to MAX". In this way, according to the embodiment of the disclosure, a maximum sampling period of the point cloud may be adaptively determined according to contents of the point cloud, and the value range of the syntax element sampling_period_minus2 may be explicitly specified.

The embodiment provides a point cloud decoding method, in which a bitstream is parsed, and geometric information of a decoded point cloud and a parsed value of a sampling period when the decoded point cloud is subjected to LOD division, are determined; a maximum allowable value of the sampling period is determined; in response to the parsed value of the sampling period being less than or equal to the maximum allowable value of the sampling period, the decoded point cloud is processed according to the parsed value of the sampling period and the geometric information, to obtain at least one refinement layer and at least one detail layer; attribute information of the decoded point cloud is decoded by using the at least one refinement layer and the at least one detail layer, and a reconstructed point cloud of the decoded point cloud is determined. In this way, since the maximum value of the sampling period is specified in the decoder, it may ensure that the preset value of the sampling period does not exceed the maximum value of the sampling period, so that when a series of processing are performed on the point cloud by using the preset value of the sampling period, system consistency may be enhanced, and decoding efficiencies may also be improved, to improve decoding performance.

Figure 5:
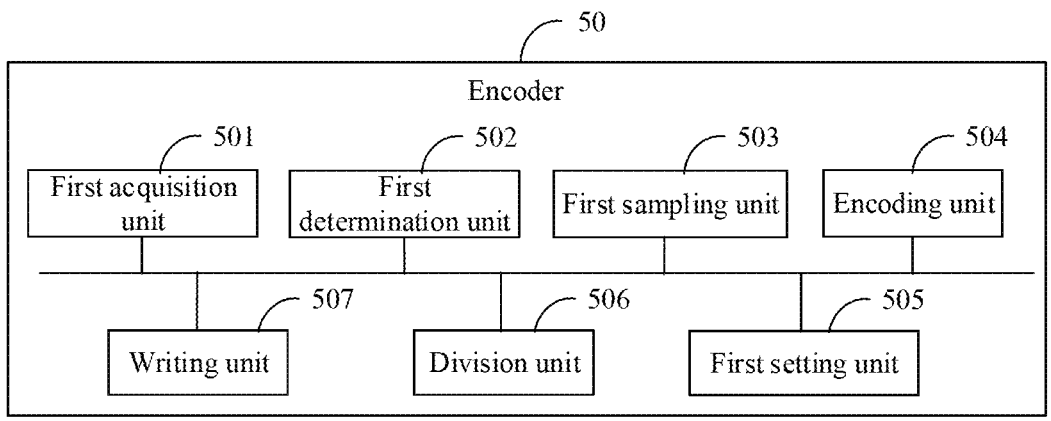
FIG. 5 is a schematic structural diagram of composition of an encoder according to an embodiment of the disclosure.

In yet another embodiment of the disclosure, based on the same inventive concept as the foregoing embodiments, with reference to FIG. 5, there is shown a schematic structural diagram of composition of an encoder 50 according to an embodiment of the disclosure. As shown in FIG. 5, the encoder 50 may include a first acquisition unit 501, a first determination unit 502, a first sampling unit 503, and an encoding unit 504.

Here, the first acquisition unit 501 is configured to acquire geometric information and attribute information of an input point cloud.

The first determination unit 502 is configured to determine a maximum allowable value of a sampling period when the input point cloud is subjected to LOD division, and determine a preset value of the sampling period based on the maximum allowable value of the sampling period.

The first sampling unit 503 is configured to process the input point cloud according to the preset value of the sampling period and the geometric information, to obtain at least one refinement layer and at least one detail layer.

The encoding unit 504 is configured to encode the attribute information by using the at least one refinement layer and the at least one detail layer, to generate a bitstream, and write the preset value of the sampling period into the bitstream.

In some embodiments, the first determination unit 502 is further configured to: determine a total number of points contained in the input point cloud; and determine the maximum allowable value of the sampling period according to the total number of points contained in the input point cloud.

In some embodiments, with reference to FIG. 5, the encoder 50 may further include a first setting unit 505 configured to set the maximum allowable value of the sampling period to be equal to the total number of points contained in the input point cloud.

In some embodiments, the first determination unit 502 is further configured to: determine a conformance parameter of the input point cloud, here, the conformance parameter includes at least one of a profile parameter, a tier parameter, or a level parameter; and determine the maximum allowable value of the sampling period according to the conformance parameter.

In some embodiments, the first setting unit 505 is further configured to set the maximum allowable value of the sampling period to be equal to a preset value corresponding to the conformance parameter.

In some embodiments, the first setting unit 505 is further configured to set the maximum allowable value of the sampling period as a preset constant value.

In some embodiments, with reference to FIG. 5, the encoder 50 may further include a division unit 506.

The first determination unit 502 is further configured to determine a total number of points contained in the input point cloud.

The division unit 506 is configured to: in response to the total number of points contained in the input point cloud being greater than a maximum allowable number of points contained in a slice, divide the input point cloud to obtain at least one slice.

The first determination unit 502 is further configured to: determine a number of points contained in the at least one slice; and determine the maximum allowable value of the sampling period according to the number of points contained in the at least one slice.

In some embodiments, the first determination unit 502 is further configured to select a selecting a maximum value from the number of points, and determine the maximum value as the maximum allowable value of the sampling period.

In some embodiments, the first setting unit 505 is further configured to set the maximum allowable value of the sampling period to be equal to the maximum allowable number of points contained in the slice.

In some embodiments, with reference to FIG. 5, the encoder 50 may further include a writing unit 507.

The first determination unit 502 is further configured to determine a value of a first syntax element corresponding to the at least one slice according to the number of points contained in the at least one slice, here, the first syntax element is configured to indicate the number of points contained in the at least one slice.

The writing unit 507 is configured to write the value of the first syntax element into the bitstream.

In some embodiments, the first setting unit 505 is further configured to set the value of the first syntax element to be equal to a sum of the number of points contained in the at least one slice and a first constant value, here, the first constant value is a preset integer value.

In some embodiments, the first constant value is equal to −1.

In some embodiments, the writing unit 507 is further configured to: write the value of the first syntax element into a geometric data unit of the at least one slice; and write the geometric data unit of the at least one slice into the bitstream.

In some embodiments, the first acquisition unit 501 is configured to acquire a candidate input value of the sampling period.

The first determination unit 502 is further configured to: in response to the candidate input value of the sampling period being less than or equal to the maximum allowable value of the sampling period, determine the candidate input value of the sampling period as the preset value of the sampling period.

In some embodiments, the first setting unit 505 is further configured to set the preset value of the sampling period to be less than or equal to the maximum allowable value of the sampling period.

In some embodiments, the first determination unit 502 is further configured to determine a maximum allowable value of a second syntax element based on the maximum allowable value of the sampling period, here, the second syntax element is configured to indicate a sampling period when the input point cloud is subjected to LOD division.

In some embodiments, the first setting unit 505 is further configured to set the maximum allowable value of the second syntax element to be equal to a sum of the maximum allowable value of the sampling period and a second constant value, here, the second constant value is a preset integer value.

In some embodiments, the second constant value is equal to −2.

In some embodiments, the first setting unit 505 is further configured to set the maximum allowable value of the second syntax element to be equal to the maximum allowable value of the sampling period.

In some embodiments, the first determination unit 502 is further configured to determine a value of a second syntax element based on the preset value of the sampling period.

The writing unit 507 is further configured to write the value of the second syntax element into the bitstream.

In some embodiments, the first determination unit 502 is further configured to determine a value of a second syntax element based on the preset value of the sampling period.

The writing unit 507 is further configured to write the value of the second syntax element into APS, and write APS into the bitstream.

In some embodiments, the value of the second syntax element is less than or equal to a maximum allowable value of the second syntax element.

In some embodiments, the first setting unit 505 is further configured to set the value of the second syntax element to be equal to a sum of the preset value of the sampling period and a third constant value, here, the third constant value is a preset integer value.

In some embodiments, the third constant value is equal to −2.

In some embodiments, the first determination unit 502 is further configured to determine a first bit number corresponding to the second syntax element in the bitstream according to the maximum allowable value of the sampling period.

The writing unit 507 is further configured to convert the value of the second syntax element into a binary bit string of the first bit number, and write the binary bit string of the first bit number into the bitstream.

In some embodiments, the first setting unit 505 is further configured to set the first bit number to be equal to or greater than a minimum integer value of a logarithm of the maximum allowable value of the sampling period based on 2.

In some embodiments, the first sampling unit 503 is further configured to process the input point cloud by using the preset value of the sampling period based on the geometric information, to obtain a first refinement layer and a first detail layer.

In some embodiments, the first sampling unit 503 is further configured to: process a target detail layer by using the preset value of the sampling period, to obtain a next refinement layer and a next detail layer; and in response to a number of points in the next detail layer being greater than 1, set the obtained next detail layer as the target detail layer, and continue execution of processing the target detail layer by using the preset value of the sampling period, to obtain the next refinement layer and the next detail layer, until the number of points in the next detail layer is equal to 1, to stop the execution.

In some embodiments, the first sampling unit 503 is further configured to: process a target detail layer by using the preset value of the sampling period, to obtain a next refinement layer and a next detail layer, and perform an operation of adding 1 to a currently division number of layers; and in response to the currently division number of layers being less than a preset division number of layers, set the obtained next detail layer as the target detail layer, and continue execution of processing the target detail layer by using the preset value of the sampling period, to obtain the next refinement layer and the next detail layer, and of performing the operation of adding 1 to the currently division number of layers, until the currently division number of layers is equal to the preset division number of layers, to stop the execution.

In some embodiments, the first determination unit 502 is further configured to determine a target preset value of the sampling period corresponding to the target detail layer based on the maximum allowable value of the sampling period.

The first sampling unit 503 is further configured to process the target detail layer by using the target preset value of the sampling period, to obtain the next refinement layer and the next detail layer.

In some embodiments, the target preset value of the sampling period is less than or equal to the maximum allowable value of the sampling period.

It may be understood that in the embodiment of the disclosure, "unit" may be a part of a circuit, a part of a processor, a part of a program or software, or the like. Of course, "unit" may also be a module, or may be non-modular. Furthermore, components in the embodiment may be integrated into a processing unit, or each unit may physically exist alone, or two or more units may be integrated into a unit. The integrated unit may be implemented in form of hardware, or may be implemented in form of a software function module.

When the integrated unit is implemented in form of the software function module rather than sold or used as an independent product, the integrated unit may be stored in a computer-readable storage medium. Based on such an understanding, the technical solution of the embodiment substantially or parts making contributions to the related art, or all or part of the technical solution may be embodied in form of a software product, and the computer software product is stored in a storage medium, including a plurality of instructions configured to enable a computer device (which may be a personal computer, a server, a network device, or the like) or a processor to execute all or part of operations of the method described in the embodiment. The forgoing storage medium includes various media capable of storing program codes, such as a U disk, a mobile hard disk, a Read Only Memory (ROM), a Random Access Memory (RAM), a magnetic disk, or an optical disk, or the like.

Therefore, an embodiment of the disclosure provides a computer storage medium, applied to the encoder 50. The computer storage medium stores a computer program, and when the computer program is executed by a first processor, the method according to any one of the foregoing embodiments is implemented.

Figure 6:
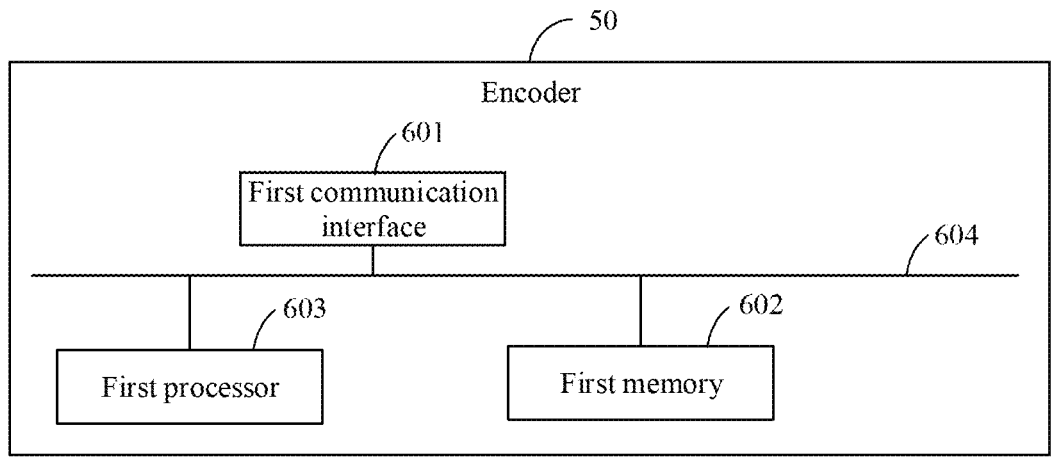
FIG. 6 is a schematic structural diagram of specific hardware of an encoder according to an embodiment of the disclosure.

Based on the composition of the encoder 50 and the computer storage medium, with reference to FIG. 6, there is shown a schematic structural diagram of specific hardware of an encoder 50 according to an embodiment of the disclosure. As shown in FIG. 6, the specific hardware of the encoder may include a first communication interface 601, a first memory 602, and a first processor 603, these components are coupled together by a first bus system 604. It may be understood that the first bus system 604 is configured to implement connection and communication between these components. The first bus system 604 further includes a power bus, a control bus, and a state signal bus, besides a data bus. However, various buses are marked as the first bus system 604 in FIG. 6, for clarity of illustration.

Here, the first communication interface 601 is configured to receive and transmit signals in a process of receiving and transmitting information between the encoder and other external network elements.

The first memory 602 is configured to store a computer program executable on the first processor 603.

The first processor 603 is configured to execute the following operations upon executing the computer program:
  acquiring geometric information and attribute information of an input point cloud;
  determining a maximum allowable value of a sampling period when the input point cloud is subjected to LOD division;
  determining a preset value of the sampling period based on the maximum allowable value of the sampling period;
  processing the input point cloud according to the preset value of the sampling period and the geometric information, to obtain at least one refinement layer and at least one detail layer; and
  encoding the attribute information by using the at least one refinement layer and the at least one detail layer, to generate a bitstream, and writing the preset value of the sampling period into the bitstream.

It may be understood that the first memory 602 in the embodiment of the disclosure may be a volatile memory or a non-volatile memory, or may include both volatile and non-volatile memories. The non-volatile memory may be a ROM, a programmable ROM (PROM), an Erasable PROM (EPROM), an Electrically EPROM (EEPROM), or a flash memory. The volatile memory may be a RAM which is used as an external cache. By way of exemplary rather than restrictive descriptions, many forms of RAMs are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM) and a Direct Rambus RAM (DRRAM). The first memory 602 of the systems and methods described in the disclosure is intended to include, but is not limited to, these and any other suitable type of memories.

Furthermore, the first processor 603 may be an integrated circuit chip with a signal processing capability. During implementation, operations of the foregoing methods may be completed by an integrated logical circuit in a hardware form in the first processor 603 or an instruction in a software form. The first processor 603 may be a general-purpose processor, a Digital Signal Processor (DSP), an Application Specific Integrated Circuit (ASIC), a Field Programmable Gate Array (FPGA), or another programmable logic device, a discrete gate or a transistor logic device, a discrete hardware component. The methods, operations and logical block diagrams disclosed in the embodiments of the disclosure may be implemented or performed. The general-purpose processor may be a microprocessor, or the processor may be any conventional processor or the like. Operations of the methods disclosed in combination with the embodiments of the disclosure may be directly embodied to be executed and completed by a hardware decoding processor or executed and completed by a combination of hardware in the decoding processor and software modules. The software module may be located in a mature storage medium in the art, such as a RAM, a flash memory, a ROM, a PROM, an EEPROM, a register, or the like. The storage medium is located in the first memory 602, and the first processor 603 reads information in the first memory 602, and completes operations of the above methods in combination with the hardware thereof.

It may be understood that these embodiments described in the disclosure may be implemented by hardware, software, firmware, middleware, microcode, or a combination thereof. For implementation based on hardware, the processing unit may be implemented in one or more ASICs, a DSP, a DSP Device (DSPD), a Programmable Logic Device (PLD), an FPGA, a general-purpose processor, a controller, a micro-controller, a microprocessor, other electronic units configured to perform the functions described in the disclosure, or a combination thereof. For implementation based on software, technologies described in the disclosure may be implemented by modules (e.g., processes, functions, or the like) performing the functions described in the disclosure. Software codes may be stored in the memory and executed by the processor. The memory may be implemented in the processor or outside the processor.

Optionally, in another embodiment, the first processor 603 is further configured to execute the method according to any one of the foregoing embodiments when it executes the computer program.

The embodiment provides an encoder which may include a first acquisition unit, a first determination unit, a first sampling unit, and an encoding unit. In this way, since the maximum value of the sampling period is specified in the encoder, it may ensure that the preset value of the sampling period does not exceed the maximum value of the sampling period, so that when a series of processing are performed on the point cloud by using the preset value of the sampling period, system consistency may be enhanced, and encoding efficiency may also be improved, to improve encoding performance.

Figure 7:
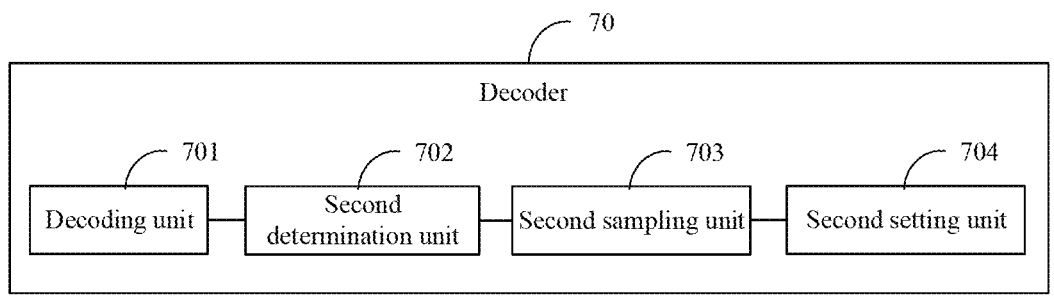
FIG. 7 is a schematic structural diagram of composition of a decoder according to an embodiment of the disclosure.

In yet another embodiment of the disclosure, based on the same inventive concept as the foregoing embodiments, with reference to FIG. 7, there is shown a schematic structural diagram of composition of a decoder 70 according to an embodiment of the disclosure. As shown in FIG. 7, the decoder 70 may include a decoding unit 701, a second determination unit 702, and a second sampling unit 703.

Here, the decoding unit 701 is configured to determine geometric information of a decoded point cloud and a parsed value of a sampling period when the decoded point cloud is subjected to LOD division.

The second determination unit 702 is configured to determine a maximum allowable value of the sampling period.

The second sampling unit 703 is configured to: in response to the parsed value of the sampling period being less than or equal to the maximum allowable value of the sampling period, process the decoded point cloud according to the parsed value of the sampling period and the geometric information, to obtain at least one refinement layer and at least one detail layer.

The decoding unit 701 is further configured to decode attribute information of the decoded point cloud by using the at least one refinement layer and the at least one detail layer, and determine a reconstructed point cloud of the decoded point cloud.

In some embodiments, the second determination unit 702 is further configured to: determine a maximum allowable number of points contained in a slice; and determine the maximum allowable value of the sampling period according to the maximum allowable number of points contained in the slice.

In some embodiments, with reference to FIG. 7, the decoder 70 may further include a second setting unit 704 configured to set the maximum allowable value of the sampling period to be equal to the maximum allowable number of points contained in the slice.

In some embodiments, the decoding unit 701 is further configured to parse the bitstream and determine a value of a first syntax element corresponding to at least one slice, here, the first syntax element is configured to indicate a number of points contained in the at least one slice.

The second determination unit 702 is further configured to: determine the number of points contained in the at least one slice according to the value of the first syntax element; and determine the maximum allowable value of the sampling period according to the number of points contained in the at least one slice.

In some embodiments, the second determination unit 702 is further configured to select a maximum value from the number of points, and determine the maximum value as the maximum allowable value of the sampling period.

In some embodiments, the decoding unit 701 is further configured to parse the bitstream and determine a geometric data unit of the at least one slice.

The second determination unit 702 is further configured to determine, from the geometric data unit of the at least one slice, the value of the first syntax element corresponding to the at least one slice.

In some embodiments, the second setting unit 704 is further configured to set a value of the number of points contained in the at least one slice to be equal to a sum of the value of the first syntax element and a first constant value, here, the first constant value is a preset integer value.

In some embodiments, the first constant value is equal to 1.

In some embodiments, the decoding unit 701 is further configured to parse the bitstream and determine a total number of points contained in the decoded point cloud.

The second determination unit 702 is further configured to determine the maximum allowable value of the sampling period according to the total number of points contained in the decoded point cloud.

In some embodiments, the second setting unit 704 is further configured to set the maximum allowable value of the sampling period to be equal to the total number of points contained in the decoded point cloud.

In some embodiments, the decoding unit 701 is further configured to parse the bitstream and determine a conformance parameter, here, the conformance parameter includes at least one of a profile parameter, a tier parameter, or a level parameter.

The second determination unit 702 is further configured to determine the maximum allowable value of the sampling period according to the conformance parameter.

In some embodiments, the second setting unit 704 is further configured to set the maximum allowable value of the sampling period to be equal to a preset value corresponding to the conformance parameter.

In some embodiments, the second setting unit 704 is further configured to set the maximum allowable value of the sampling period as a preset constant value.

In some embodiments, the decoding unit 701 is further configured to parse the bitstream and determine a value of a second syntax element, here, the second syntax element is configured to indicate a sampling period when the decoded point cloud is subjected to LOD division.

The second determination unit 702 is further configured to determine the parsed value of the sampling period according to the value of the second syntax element.

In some embodiments, the decoding unit 701 is further configured to parse the bitstream and acquire APS.

The second acquisition unit 704 is further configured to determine the value of the second syntax element from APS.

In some embodiments, the second determination unit 702 is further configured to determine a first bit number corresponding to the second syntax element in the bitstream according to the maximum allowable value of the sampling period.

In some embodiments, the second setting unit 704 is further configured to set the first bit number to be equal to or greater than a minimum integer value of a logarithm of the maximum allowable value of the sampling period based on 2.

In some embodiments, the second setting unit 704 is further configured to: read, from the bitstream, a binary bit string, a number of bits in the binary bit string being equal to the first bit number; and set the value of the second syntax element to be equal to an unsigned integer corresponding to the binary bit string.

In some embodiments, the second determination unit 702 is further configured to determine a maximum allowable value of the second syntax element based on the maximum allowable value of the sampling period.

In some embodiments, the second setting unit 704 is further configured to set the maximum allowable value of the second syntax element to be equal to a sum of the maximum allowable value of the sampling period and a second constant value, here, the second constant value is a preset integer value.

In some embodiments, the second constant value is equal to −2.

In some embodiments, the second setting unit 704 is further configured to set the maximum allowable value of the second syntax element to be equal to the maximum allowable value of the sampling period.

In some embodiments, the value of the second syntax element is less than or equal to the maximum allowable value of the second syntax element.

In some embodiments, the second setting unit 704 is further configured to set the parsed value of the sampling period to be equal to a sum of the value of the second syntax element and a third constant value, here, the third constant value is a preset integer value.

In some embodiments, the third constant value is equal to 2.

In some embodiments, the second sampling unit 703 is further configured to process the decoded point cloud by using the parsed value of the sampling period based on the geometric information, to obtain a first refinement layer and a first detail layer.

In some embodiments, the second sampling unit 703 is further configured to: process a target detail layer by using the parsed value of the sampling period, to obtain a next refinement layer and a next detail layer; and in response to a number of points in the next detail layer being greater than 1, set the obtained next detail layer as the target detail layer, and continue execution of processing the target detail layer by using the parsed value of the sampling period, to obtain the next refinement layer and the next detail layer, until the number of points in the next detail layer is equal to 1, to stop the execution.

In some embodiments, the second sampling unit 703 is further configured to: process a target detail layer by using the parsed value of the sampling period, to obtain a next refinement layer and a next detail layer, and perform an operation of adding 1 to a currently division number of layers; and in response to the currently division number of layers being less than a preset division number of layers, set the obtained next detail layer as the target detail layer, and continue execution of processing the target detail layer by using the parsed value of the sampling period, to obtain the next refinement layer and the next detail layer, and of performing the operation of adding 1 to the currently division number of layers, until the currently division number of layers is equal to the preset division number of layers, to stop the execution.

In some embodiments, the decoding unit 701 is further configured to parse the bitstream, and determine a target parsed value of the sampling period corresponding to the target detail layer.

In some embodiments, the second sampling unit 703 is further configured to process the target detail layer by using the target parsed value of the sampling period, to obtain the next refinement layer and the next detail layer.

In some embodiments, the target parsed value of the sampling period is less than or equal to the maximum allowable value of the sampling period.

It may be understood that in the embodiment, "unit" may be a part of a circuit, a part of a processor, a part of a program or software, or the like. Of course, "unit" may also be a module, or may be non-modular. Furthermore, components in the embodiment may be integrated into a processing unit, or each unit may physically exist alone, or two or more units may be integrated into a unit. The integrated unit may be implemented in form of hardware, or may be implemented in form of a software function module.

When the integrated unit is implemented in form of the software function module rather than sold or used as an independent product, the integrated unit may be stored in a computer-readable storage medium. Based on such an understanding, the embodiment provides a computer storage medium, applied to the decoder 70. The computer storage medium stores a computer program, and when the computer program is executed by a second processor, the method according to any one of the foregoing embodiments is implemented.

Figure 8:
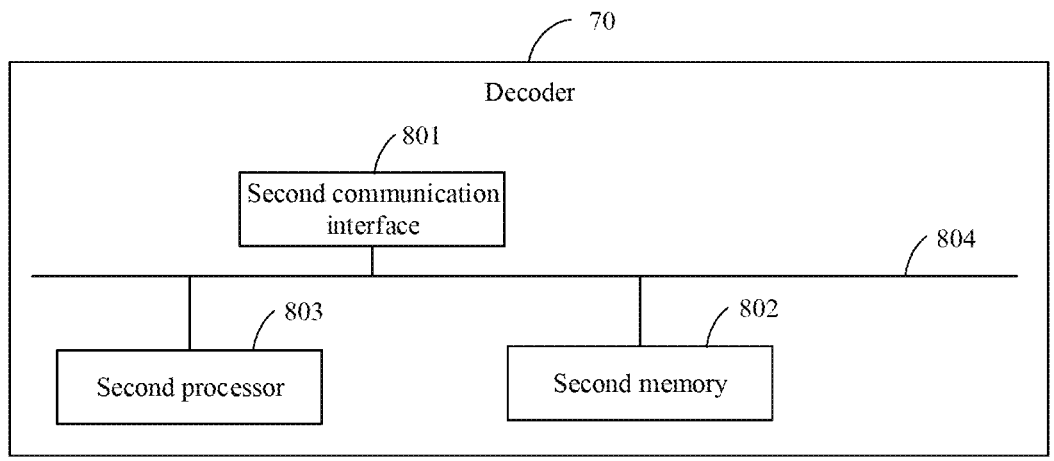
FIG. 8 is a schematic structural diagram of specific hardware of a decoder according to an embodiment of the disclosure.

Based on the composition of the decoder 70 and the computer storage medium, with reference to FIG. 8, there is shown a schematic structural diagram of specific hardware of a decoder 70 according to an embodiment of the disclosure. As shown in FIG. 8, the specific hardware of the decoder may include a second communication interface 801, a second memory 802, and a second processor 803, these components are coupled together by a second bus system 804. It may be understood that the second bus system 804 is configured to implement connection and communication between these components. The second bus system 804 further includes a power bus, a control bus, and a state signal bus, besides a data bus. However, various buses are marked as the second bus system 804 in FIG. 8, for clarity of illustration.

Here, the second communication interface 801 is configured to receive and transmit signals in a process of receiving and transmitting information between the decoder and other external network elements.

The second memory 802 is configured to store a computer program executable on the second processor 803.

The second processor 803 is configured to execute the following operations upon executing the computer program:
  parsing a bitstream, and determining geometric information of a decoded point cloud and a parsed value of a sampling period when the decoded point cloud is subjected to LOD division;
  determining a maximum allowable value of the sampling period;
  in response to the parsed value of the sampling period being less than or equal to the maximum allowable value of the sampling period, processing the decoded point cloud according to the parsed value of the sampling period and the geometric information, to obtain at least one refinement layer and at least one detail layer; and
  decoding attribute information of the decoded point cloud by using the at least one refinement layer and the at least one detail layer, and determining a reconstructed point cloud of the decoded point cloud.

Optionally, in another embodiment, the second processor 803 is further configured to execute the method according to any one of the foregoing embodiments when it executes the computer program.

It may be understood that the second memory 802 is similar to the first memory 602 in terms of their hardware functions, and the second processor 803 is similar to the first processor 603 in terms of their hardware functions, which are not elaborated here.

The embodiment provides a decoder which may include a decoding unit, a second determination unit, and a second sampling unit. In this way, since the maximum value of the sampling period is specified in the decoder, it may ensure that the preset value of the sampling period does not exceed the maximum value of the sampling period, so that when a series of processing are performed on the point cloud by using the preset value of the sampling period, system consistency may be enhanced, and decoding efficiency may also be improved, to improve decoding performance.

It should be noted that in the disclosure, terms "include", "contain" or any other variants thereof are intended to cover non-exclusive inclusion, so that a process, method, article or device including a series of elements not only includes those elements, but also includes other elements which are not explicitly listed, or elements inherent to such process, method, article or device. In the absence of more limitations, an element defined by a statement "includes a . . . " does not exclude presence of other same elements in the process, method, article or device including the element.

Serial numbers of the embodiments of the disclosure are merely for description, and do not represent advantages and disadvantages of the embodiments.

Methods disclosed in several method embodiments of the disclosure may be arbitrarily combined without conflict, to obtain a new method embodiment.

Features disclosed in several product embodiments of the disclosure may be arbitrarily combined without conflict, to obtain a new product embodiment.

Features disclosed in several method or device embodiments of the disclosure may be arbitrarily combined without conflict, to obtain a new method or device embodiment.

Contents as described above are merely specific implementations of the disclosure, however, the scope of protection of the disclosure is not limited thereto. Any variation or replacement apparent to those skilled in the art within the technical scope disclosed by the disclosure shall fall within the scope of protection of the disclosure. Therefore, the scope of protection of the disclosure shall be subjected to the scope of protection of the claims.

INDUSTRIAL APPLICABILITY

In the embodiments of the disclosure, at the encoder side, geometric information and attribute information of an input point cloud are acquired; a maximum allowable value of a sampling period when the input point cloud is subjected to LOD division, is determined; a preset value of the sampling period is determined based on the maximum allowable value of the sampling period; the input point cloud is processed according to the preset value of the sampling period and the geometric information, to obtain at least one refinement layer and at least one detail layer; the attribute information is encoded by using the at least one refinement layer and the at least one detail layer, to generate a bitstream, and the preset value of the sampling period is written into the bitstream. At the decoder side, a bitstream is parsed, and a decoded point cloud and a parsed value of a sampling period when the decoded point cloud is subjected to LOD division, are determined; in response to the parsed value of the sampling period being less than or equal to the maximum allowable value of the sampling period, the decoded point cloud is processed according to the parsed value of the sampling period and the geometric information, to obtain at least one refinement layer and at least one detail layer; attribute information of the decoded point cloud is decoded by using the at least one refinement layer and the at least one detail layer, and a reconstructed point cloud of the decoded point cloud is determined. In this way, since the maximum value of the sampling period is specified in both the encoder and the decoder, it may ensure that the preset value of the sampling period does not exceed the maximum value of the sampling period, so that when a series of processing are performed on the point cloud by using the preset value of the sampling period, system consistency may be enhanced, and encoding and decoding efficiencies may also be improved.

The invention claimed is:

1. A point cloud encoding method, applied to an encoder, the method comprising:
    acquiring geometric information and attribute information of an input point cloud;
    determining a maximum allowable value of a sampling period when the input point cloud is subjected to Level of Detail (LOD) division;
    determining a preset value of the sampling period based on the maximum allowable value of the sampling period;
    processing the input point cloud according to the preset value of the sampling period and the geometric information, to obtain at least one refinement layer and at least one detail layer;
    encoding the attribute information by using the at least one refinement layer and the at least one detail layer, to generate a bitstream, and writing the preset value of the sampling period into the bitstream, and
    determining a maximum allowable value of a second syntax element based on the maximum allowable value of the sampling period, wherein the second syntax element is configured to indicate a sampling period when the input point cloud is subjected to the LOD division.

2. The method of claim 1, wherein determining the maximum allowable value of the sampling period when the input point cloud is subjected to the LOD division comprises:
    determining a total number of points contained in the input point cloud;
    in response to the total number of points contained in the input point cloud being greater than a maximum allowable number of points contained in a slice, dividing the input point cloud to obtain at least one slice and determine a number of points contained in the at least one slice; and
    determining the maximum allowable value of the sampling period according to the number of points contained in the at least one slice.

3. The method of claim 2, wherein determining the maximum allowable value of the sampling period according to the number of points contained in the at least one slice comprises:
    selecting a maximum value from the number of points, and determining the maximum value as the maximum allowable value of the sampling period.

4. The method of claim 2, further comprising:
    setting the maximum allowable value of the sampling period to be equal to the maximum allowable number of points contained in the slice.

5. The method of claim 2, further comprising:
    determining a value of a first syntax element corresponding to the at least one slice according to the number of points contained in the at least one slice, wherein the first syntax element is configured to indicate the number of points contained in the at least one slice; and writing the value of the first syntax element into the bitstream.

6. The method of claim 1, wherein determining the maximum allowable value of the second syntax element based on the maximum allowable value of the sampling period comprises:

setting the maximum allowable value of the second syntax element to be equal to a sum of the maximum allowable value of the sampling period and a second constant value, wherein the second constant value is a preset integer.

7. The method of claim 6, wherein the second constant value is equal to −2.

8. The method of claim 1, wherein determining the maximum allowable value of the second syntax element based on the maximum allowable value of the sampling period comprises:

setting the maximum allowable value of the second syntax element to be equal to the maximum allowable value of the sampling period.

9. The method of claim 1, wherein writing the preset value of the sampling period into the bitstream comprises:

determining a value of a second syntax element based on the preset value of the sampling period; and writing the value of the second syntax element into an attribute parameter set, and writing the attribute parameter set into the bitstream.

10. The method of claim 9, wherein the value of the second syntax element is less than or equal to a maximum allowable value of the second syntax element.

11. The method of claim 9, wherein determining the value of the second syntax element based on the preset value of the sampling period comprises:

setting the value of the second syntax element to be equal to a sum of the preset value of the sampling period and a third constant value, wherein the third constant value is a preset integer.

12. The method of claim 11, wherein the third constant value is equal to −2.

13. A point cloud decoding method, applied to a decoder, the method comprising:

parsing a bitstream, and determining geometric information of a decoded point cloud and a parsed value of a sampling period when the decoded point cloud is subjected to Level of Detail (LOD) division;

determining a maximum allowable value of the sampling period;

in response to the parsed value of the sampling period being less than or equal to the maximum allowable value of the sampling period, processing the decoded point cloud according to the parsed value of the sampling period and the geometric information, to obtain at least one refinement layer and at least one detail layer; and decoding attribute information of the decoded point cloud by using the at least one refinement layer and the at least one detail layer, and determining a reconstructed point cloud of the decoded point cloud, wherein parsing the bitstream, and determining the parsed value of the sampling period comprises:

parsing the bitstream and determining a value of a second syntax element, wherein the second syntax element is configured to indicate a sampling period when the decoded point cloud is subjected to the LOD division; and determining the parsed value of the sampling period according to the value of the second syntax element.

14. The method of claim 13, wherein determining the maximum allowable value of the sampling period comprises:

determining a maximum allowable number of points contained in a slice; and determining the maximum allowable value of the sampling period according to the maximum allowable number of points contained in the slice.

15. The method of claim 14, wherein determining the maximum allowable value of the sampling period according to the maximum allowable number of points contained in the slice comprises:

setting the maximum allowable value of the sampling period to be equal to the maximum allowable number of points contained in the slice.

16. The method of claim 13, wherein determining the maximum allowable value of the sampling period comprises:

parsing the bitstream and determining a value of a first syntax element corresponding to at least one slice, wherein the first syntax element is configured to indicate a number of points contained in the at least one slice;

determining the number of points contained in the at least one slice according to the value of the first syntax element; and determining the maximum allowable value of the sampling period according to the number of points contained in the at least one slice.

17. The method of claim 16, wherein determining the maximum allowable value of the sampling period according to the number of points contained in the at least one slice comprises:

selecting a maximum value from the number of points, and determining the maximum value as the maximum allowable value of the sampling period.

18. The method of claim 13, wherein parsing the bitstream and determining the value of the second syntax element comprises:

parsing the bitstream and acquiring an attribute parameter set; and determining the value of the second syntax element from the attribute parameter set.

19. The method of claim 13, further comprising:

determining a maximum allowable value of the second syntax element based on the maximum allowable value of the sampling period.

20. The method of claim 19, wherein determining the maximum allowable value of the second syntax element based on the maximum allowable value of the sampling period comprises:

setting the maximum allowable value of the second syntax element to be equal to a sum of the maximum allowable value of the sampling period and a second constant value, wherein the second constant value is a preset integer.

21. The method of claim 20, wherein the second constant value is equal to −2.

22. The method of claim 19, wherein the value of the second syntax element is less than or equal to the maximum allowable value of the second syntax element.

23. The method of claim 13, wherein determining the parsed value of the sampling period according to the value of the second syntax element comprises:

setting the parsed value of the sampling period to be equal to a sum of the value of the second syntax element and a third constant value, wherein the third constant value is a preset integer.

24. The method of claim 23, wherein the third constant value is equal to 2.

25. An encoder, comprising a memory and a processor, wherein the memory is configured to store a computer program executable on the processor, the processor is configured to execute operations of:

acquiring geometric information and attribute information of an input point cloud;

determining a maximum allowable value of a sampling period when the input point cloud is subjected to Level of Detail (LOD) division;

determining a preset value of the sampling period based on the maximum allowable value of the sampling period;

processing the input point cloud according to the preset value of the sampling period and the geometric information, to obtain at least one refinement layer and at least one detail layer;

encoding the attribute information by using the at least one refinement layer and the at least one detail layer, to generate a bitstream, and writing the preset value of the sampling period into the bitstream, and determining a maximum allowable value of a second syntax element based on the maximum allowable value of the sampling period, wherein the second syntax element is configured to indicate a sampling period when the input point cloud is subjected to the LOD division.

26. A decoder, comprising a memory and a processor, wherein the memory is configured to store a computer program executable on the processor, the processor is configured to execute operations of:

parsing a bitstream, and determining geometric information of a decoded point cloud and a parsed value of a sampling period when the decoded point cloud is subjected to Level of Detail (LOD) division;

determining a maximum allowable value of the sampling period;

in response to the parsed value of the sampling period being less than or equal to the maximum allowable value of the sampling period, processing the decoded point cloud according to the parsed value of the sampling period and the geometric information, to obtain at least one refinement layer and at least one detail layer; and decoding attribute information of the decoded point cloud by using the at least one refinement layer and the at least one detail layer, and determining a reconstructed point cloud of the decoded point cloud, wherein parsing the bitstream, and determining the parsed value of the sampling period comprises:

parsing the bitstream and determining a value of a second syntax element, wherein the second syntax element is configured to indicate a sampling period when the decoded point cloud is subjected to the LOD division; and determining the parsed value of the sampling period according to the value of the second syntax element.

* * * * *